(12) United States Patent
Hirschmann et al.

(10) Patent No.: US 7,442,419 B2
(45) Date of Patent: *Oct. 28, 2008

(54) LIQUID-CRYSTALLINE MEDIUM AND LIQUID-CRYSTAL DISPLAY

(75) Inventors: Harald Hirschmann, Darmstadt (DE); Martina Weidner, Muenster (DE); Michael Wittek, Darmstadt (DE); Volker Reiffenrath, Rossdorf (DE); Brigitte Schuler, Grossostheim (DE); Markus Czanta, Darmstadt (DE); Renate Bender, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/684,190

(22) Filed: Mar. 9, 2007

(65) Prior Publication Data

US 2007/0228327 A1 Oct. 4, 2007

(30) Foreign Application Priority Data

Mar. 10, 2006 (DE) .................. 10 2006 011 204

(51) Int. Cl.
*C09K 19/30* (2006.01)
*C09K 19/34* (2006.01)
*C09K 19/12* (2006.01)

(52) U.S. Cl. .............. 428/1.1; 252/299.61; 252/299.63; 252/299.66

(58) Field of Classification Search .................. 428/1.1; 252/299.61, 299.63, 299.66
See application file for complete search history.

(56) References Cited

U.S. PATENT DOCUMENTS

| | | | | |
|---|---|---|---|---|
| 6,015,508 A | * | 1/2000 | Ohnishi et al. | 252/299.63 |
| 6,017,469 A | | 1/2000 | Reiffenrath et al. | |
| 6,174,457 B1 | * | 1/2001 | Kato et al. | 252/299.63 |
| 6,180,027 B1 | * | 1/2001 | Kato et al. | 252/299.63 |
| 6,207,076 B1 | * | 3/2001 | Koga et al. | 252/299.63 |
| 7,074,464 B2 | * | 7/2006 | Kato | 252/299.63 |
| 2007/0001149 A1 | | 1/2007 | Manabe et al. | |
| 2007/0034830 A1 | | 2/2007 | Heckmeier et al. | |

FOREIGN PATENT DOCUMENTS

| | | |
|---|---|---|
| DE | 44 41 963 A1 | 11/1995 |
| DE | 44 34 851 A1 | 4/1996 |
| DE | 195 11 632 A1 | 10/1996 |
| DE | 10 2004 030315 A1 | 1/2005 |
| WO | WO 95/30723 A | 11/1995 |
| WO | WO 98/08791 A | 3/1998 |
| WO | WO 2004/104137 A | 12/2004 |

* cited by examiner

*Primary Examiner*—Shean C Wu
(74) *Attorney, Agent, or Firm*—Millen, White, Zelano & Branigan, P.C.

(57) ABSTRACT

Disclosed are a liquid-crystalline medium, the use thereof for electro-optical purposes, and displays containing this medium, characterised in that the medium contains one or more compounds of formula I

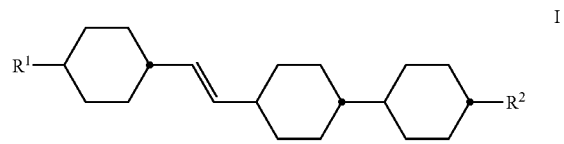

and one or more compounds selected from compounds of formulae K-1 to K-11, containing a $CF_2O$ bridge.

22 Claims, No Drawings

LIQUID-CRYSTALLINE MEDIUM AND LIQUID-CRYSTAL DISPLAY

The present invention relates to a liquid-crystalline medium and to the use thereof for electro-optical purposes and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure. In addition, there are also cells which operate with an electric field parallel to the substrate and liquid-crystal plane, such as IPS (in-plane switching) cells, in particular TN, STN and IPS cells. TN, STN and IPS cells, in particular, are currently commercially interesting areas of application for the media according to the invention.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity. For example, for matrix liquid-crystal displays with integrated non-linear elements for switching individual pixels (MLC displays), media having positive dielectric anisotropy, broad nematic phases, very high specific resistance, good UV and temperature stability and relatively low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN or IPS effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions, mobile video equipment and large-format televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy the increasing requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually adequately low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

For TV and video applications, displays having short response times are required. Such short response times can be achieved, in particular, if liquid-crystal media having low values for the viscosity, in particular the rotational viscosity $\gamma_1$, are used. However, diluent additives generally reduce the clearing point and thus the working-temperature range of the medium.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:
- extended nematic phase range (in particular down to low temperatures)
- storage-stable, even at extremely low temperatures
- the ability to switch quickly, even at extremely low temperatures (automobiles, avionics)
- increased resistance to UV radiation (longer life)

The media available from the prior art do not allow these advantages to be achieved while simultaneously retaining the other parameters.

In the case of supertwisted (STN) cells, media are desired which facilitate greater multiplexability and/or a lower threshold voltage and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention is based on the object of providing media, in particular for MLC, TN or STN displays of this type, which do not have the above-mentioned disadvantages or only do so to a lesser extent and preferably at the same time have very high specific resistance values and low threshold voltages.

It has now been found that these objects can be achieved if media according to the invention are used in displays. The media according to the invention are distinguished by very low rotational viscosities $\gamma_1$ in combination with a high clearing point ($T_{cl}$) and good low-temperature properties.

WO 95/30723 A1 discloses an STN liquid-crystal mixture comprising compounds of the formula

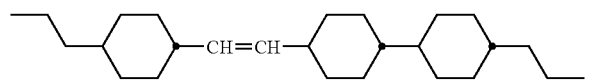

The terminal chains of this compound are saturated alkyl groups. A further mixture is disclosed therein which comprises, inter alia, a terminally unsaturated compound of the formula

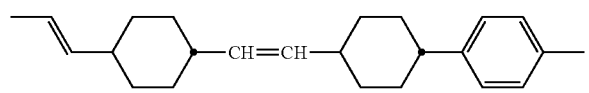

and alkyl-homologous compounds.

The invention relates to a liquid-crystalline medium based on a mixture of compounds, characterised in that it comprises one or more compounds of the formula I

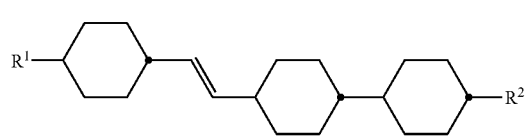

in which $R^1$ and $R^2$, independently of one another, denote an alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—, —C≡C—, —CH=CH—, —(CO)O— or —O(CO)— in such a way that O atoms are not linked directly to one another, preferably $(CH_2)_n$—CH=CH—$(CH_2)_m$H, in which n and m, independently of one another, denote an integer from 0 to 5, preferably from 0 to 2, and in addition one or more compounds selected from the compounds of the formulae K-1 to K-11 (generally K)

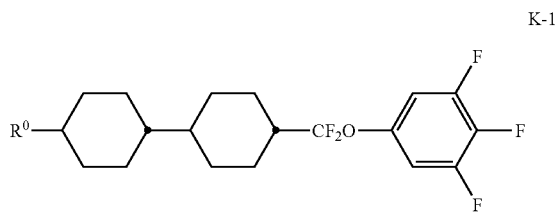

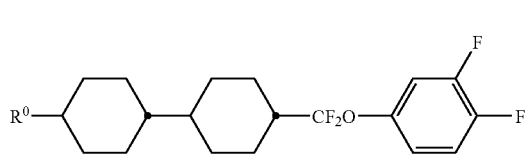

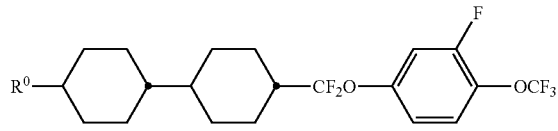

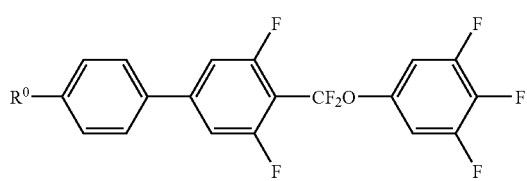

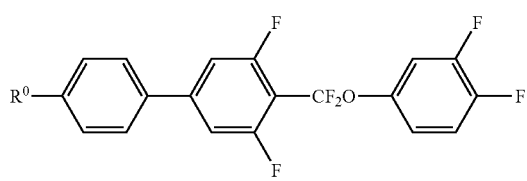

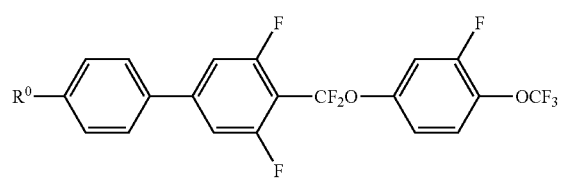

K-6

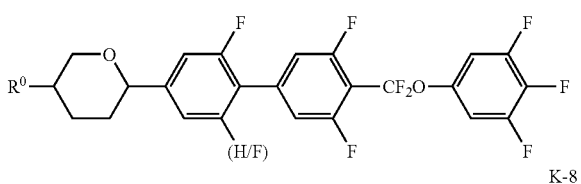

K-7

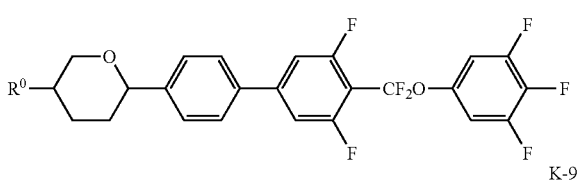

K-8

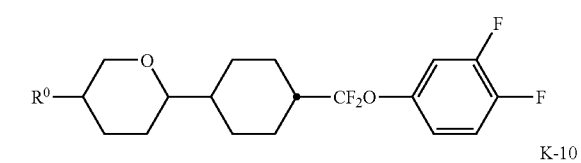

K-9

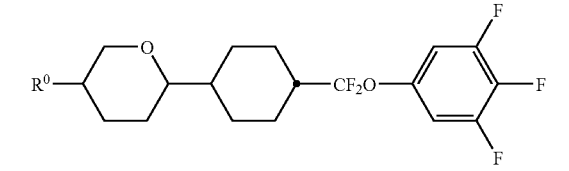

K-10

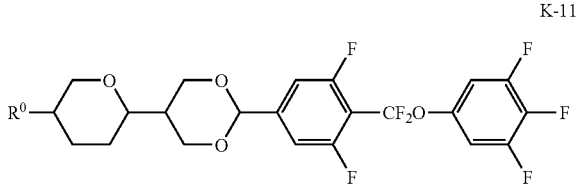

K-11 in which $R^0$ denotes n-alkyl, oxaalkyl, fluoroalkyl or alkenyl, each having up to 9 C atoms.

The media according to the invention preferably comprise one or more compounds selected from the group of the compounds of the formulae K-4, K-5, K-7 and K-8, particularly preferably of the formulae K-4 and/or K-8.

In the pure state, the compounds of the formulae I and of the formulae K are colourless and form liquid-crystalline mesophases in a temperature range which is favourably located for electro-optical use. They are stable chemically and thermally.

The compounds of the formula I are, in accordance with the invention, preferably combined with further highly polar components having $\Delta\epsilon > 8$ and with one or more neutral components ($-1.5 < \Delta\epsilon < 3$), which—at least in some cases—simultaneously have low optical anisotropy ($\Delta n < 0.08$), in order to obtain the liquid-crystalline media.

The alkenyl radicals $R^1$ and $R^2$ may be a straight-chain or branched substituent. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If $R^1$ denotes an alkenyl radical in which a $CH_2$ group adjacent to —CH=CH— has been replaced by CO or CO—O or O—CO, this may be straight-chain or branched. It is preferably straight-chain and has 4 to 12 C atoms. Accordingly, it denotes, in particular, acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl, or 9-methacryloyloxynonyl.

If $R^1$ or $R^2$ denotes an alkenyl radical which is monosubstituted by CN or $CF_3$, this radical is preferably straight-chain. The substitution by CN or $CF_3$ is in any desired position.

If $R^1$ denotes an alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups $R^1$ or $R^2$ are of importance owing to better solubility in liquid-crystalline base materials, but in particular as chiral dopants if they are optically active, Smectic compounds of this type are suitable as components of ferroelectric materials.

The compounds of the formulae I and K are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

The invention also relates to electro-optical displays (in particular MLC displays having two plane-parallel outer plates, which, together with a frame, form a cell, integrated non-linear elements for switching individual pixels on the outer plates, and a nematic liquid-crystal mixture having positive dielectric anisotropy and high specific resistance located in the cell) which contain media of this type, and to the use of these media for electro-optical purposes.

The liquid-crystal mixtures according to the invention enable a significant broadening of the available parameter latitude. The achievable combinations of clearing point, rotational viscosity, thermal stability and dielectric anisotropy are far superior to previous materials from the prior art.

The requirement for a high clearing point, nematic phase at low temperature and a high $\Delta\epsilon$ has hitherto only been achieved to an inadequate extent. Although conventional mixture systems have comparable clearing points and comparably favourable viscosities, they have, however, a $\Delta\epsilon$ of only +3. Other mixture systems have comparable viscosities and $\Delta\epsilon$ values, but only have clearing points in the region of 60° C.

The liquid-crystal mixtures according to the invention, while retaining the nematic phase down to −20° C. and preferably down to −30° C., particularly preferably down to −40°

C., enable a clearing point above 60° C., preferably above 65° C., particularly preferably above 70° C., simultaneously dielectric anisotropy values Δε of ≧3, preferably ≧5, in particular also ≧7, and a high value for the specific resistance to be achieved, enabling excellent TN and IPS displays to be obtained. In particular, the mixtures are characterised by very low rotational viscosities.

It goes without saying that, through a suitable choice of the components of the mixtures according to the invention, it is also possible for higher clearing points (for example above 90° C.) to be achieved at higher threshold voltages or lower clearing points to be achieved at lower threshold voltages with retention of the other advantageous properties. At viscosities correspondingly increased only slightly, it is likewise possible to obtain mixtures having a higher Δε and thus low thresholds or mixtures having higher clearing points. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (DE 3022818 A1), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The nematic phase range preferably has a width of at least 90° C., in particular at least 100° C. This range preferably extends at least from −20° to +70° C., preferably at least −30° to +70° C.

In the case of liquid-crystal displays, a short response time is desired. This applies in particular to displays for video reproduction. Besides the rotational viscosity $\gamma_1$, the tilt angle also influences the response time.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than analogous mixtures comprising cyanophenylcyclohexanes of the formula

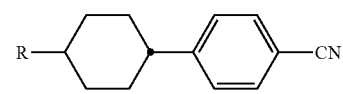

or esters of the formula

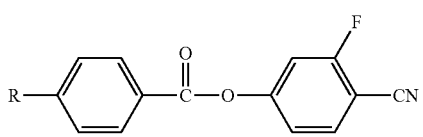

instead of the compounds of the formula I.

The compound of the formula I preferably encompasses compounds in which $R^1$ and $R^2$ each denote a mono- or di-, in particular a monounsaturated, straight-chain alkenyl group. Particular preference is given to alkenyl radicals of the formulae —CH=CH$_2$, —CH=CH—CH$_3$, —CH$_2$—CH=CH, —CH$_2$CH$_2$—CH=CH$_2$, —CH$_2$—CH$_2$—CH=CH—CH$_3$. Particular preference is given to compounds of the formulae I-1 to I-11.

The media according to the invention particularly preferably comprise one or more compounds of the formula I selected from the group of the formulae I-1 to I-11, very particularly preferably of the formulae I-1 to I-4:

I-1

I-2

I-3
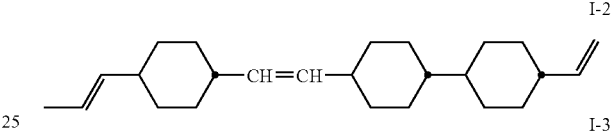

I-4
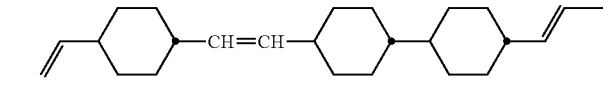

I-5
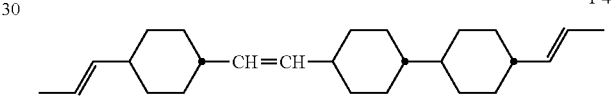

I-6
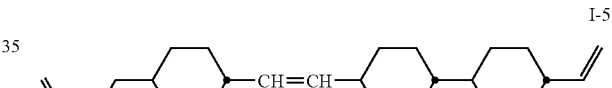

I-7
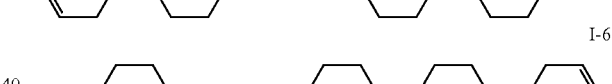

I-8
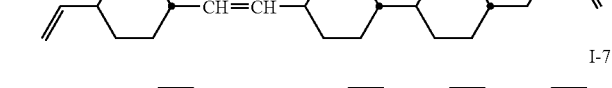

I-9
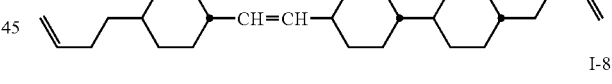

I-10
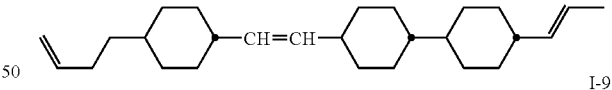

I-11
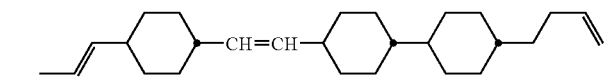

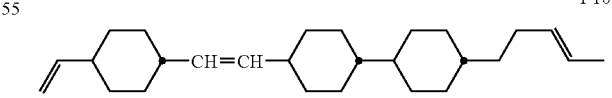

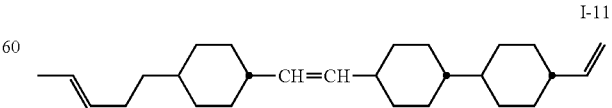

The double bond between the cyclohexane rings preferably has an E configuration. Particular preference is given to liquid-crystalline media according to the invention which comprise at least one compound of the formulae I-1, I-2, I-3 and/or I-4, in particular at least one compound of the formula I-1.

Preferred embodiments of the invention are indicated below:

- The liquid-crystalline medium is characterised in that the proportion of compounds of the formula I in the mixture as a whole is 0.5 to 25% by weight; preferably 1 to 15% by weight.
- The medium comprises one, two or more compounds selected from the compounds of the formulae I-1 to I-11; preferably from the compounds of the formulae I-1 to I-4.
- The medium comprises a compound of the formula I-1.
- The proportion of compounds of the formulae K-1 to K-11 in the liquid-crystalline medium is preferably 5 to 45% by weight, particularly preferably 5 to 30% by weight.
- The medium comprises one, two or more compounds selected from the compounds of the formulae K-1 to K-11; preferably from the group of the compounds of the formulae K-1, K-4 and K-8.
- The medium comprises one or more compounds of the formula K-4.
- The medium comprises one or more compounds of the formula K-8.
- The medium additionally comprises one, two or more bicyclic compounds selected from the compounds of the formulae Z-1 to Z-11 (generally Z)

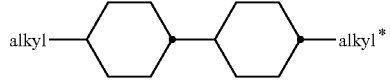
Z-1

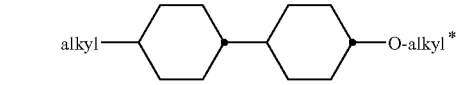
Z-2

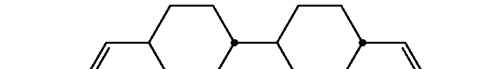
Z-3

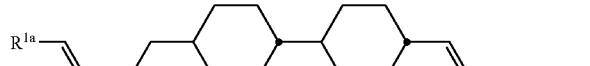
Z-4

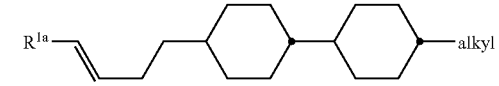
Z-5

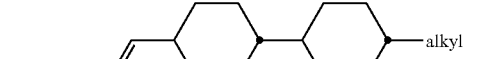
Z-6

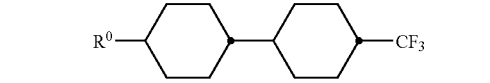
Z-7

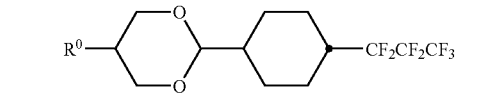
Z-8

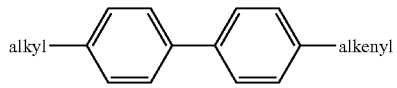
Z-9

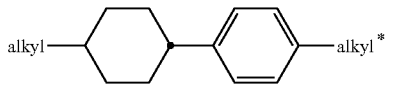
Z-10

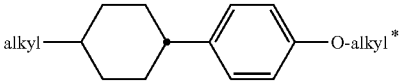
Z-11 in which $R^{1a}$ and $R^{2a}$ each, independently of one another, denote H, $CH_3$, $C_2H_5$ or $n$-$C_3H_7$, and $R^0$ denotes n-alkyl, oxaalkyl, fluoroalkyl or alkenyl, each having up to 9 C atoms.

Alkyl, alkyl* and alkenyl have the meanings indicated below;

Of the said bicyclic compounds, particular preference is given to the compounds Z-3, Z-5, Z-6, Z-7 and Z-9, very particularly the compounds of the formula Z-5 where alkyl is propyl and $R^{1a}$ is H or methyl, in particular where $R^{1a}$ is H.

The proportion of compounds of the formulae Z-1 to Z-11 in total is 5 to 70% by weight, preferably 10 to 50% by weight and particularly preferably 15 to 50% by weight. The proportion of compounds of the formula Z-5 alone is preferably 10 to 60% by weight, preferably 15 to 50% by weight.

The medium additionally comprises one or more compounds selected from compounds of formulae II to VI:

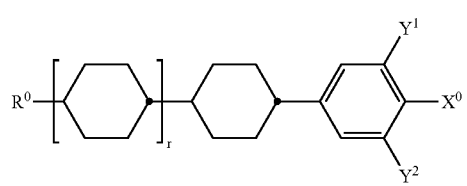
II

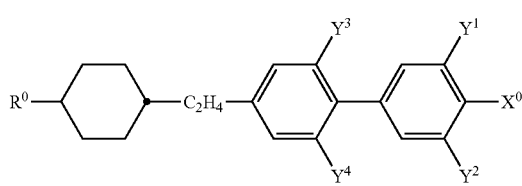
III

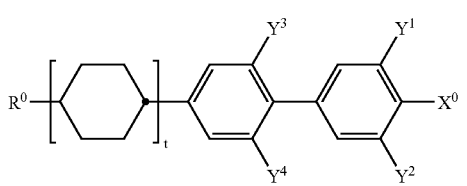
IV

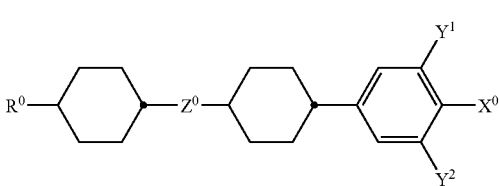
V

-continued

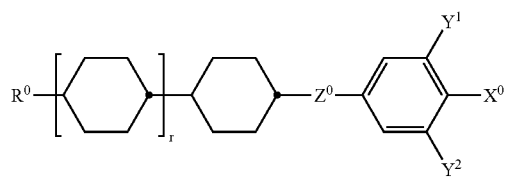
VI in which the individual radicals have the following meanings:

R⁰ n-alkyl, alkoxy, oxaalkyl, fluoroalkyl or alkenyl, each having up to 9 C atoms, X⁰ F, Cl, halogenated alkyl, halogenated alkenyl, halogenated oxaalkyl, halogenated alkenyloxy or halogenated alkoxy having up to 6 C atoms, Z⁰ —C₂F₄—, —CF=CF—, —C₂H₄—, —(CH₂)₄—, —OCH₂—, —CH₂O—, —CF₂O— or —OCF₂—, Y¹ to Y⁴ each, independently of one another, H or F, r 0 or 1, and t 0, 1 or 2.

The compounds of the formula IV are preferably a compound of the formulae IVa to IVe:

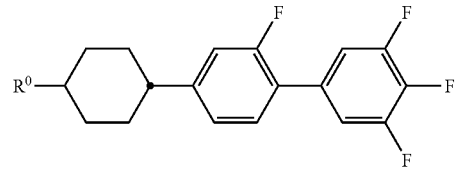
IVa

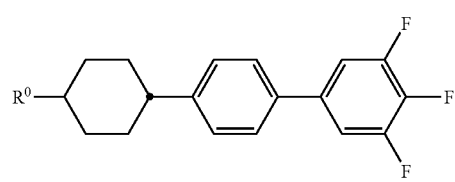
IVb

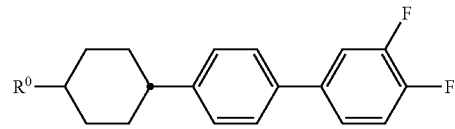
IVc

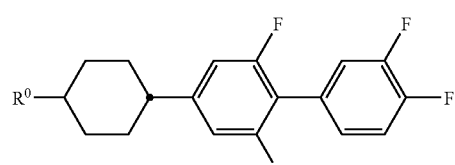
IVd

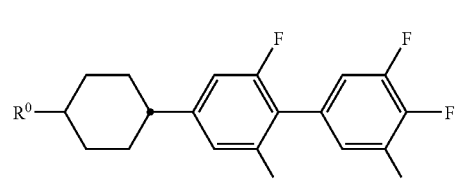
IVe

The medium additionally comprises one or more compounds selected from compounds of formulae VII to XIII:

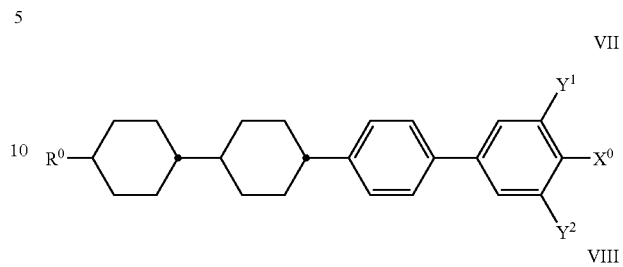
VII

VIII

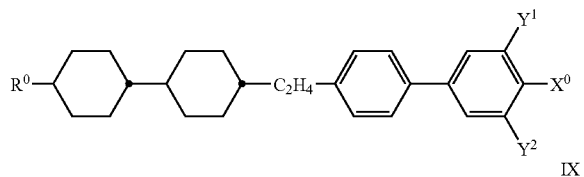
IX

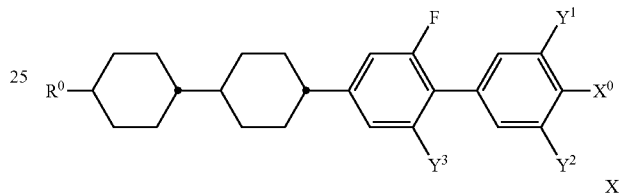
X

XI

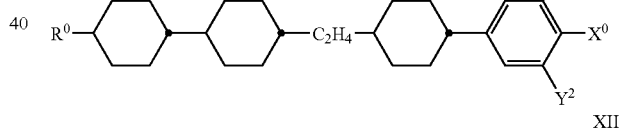
XII

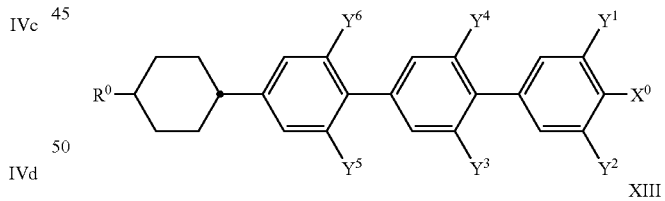
XIII in which

R⁰ denotes n-alkyl, oxaalkyl, fluoroalkyl or alkenyl, each having up to 9 C atoms, X⁰ denotes F, Cl, halogenated alkyl, halogenated alkenyl, halogenated alkenyloxy or halogenated alkoxy having up to 6 C atoms, and $Y^1$ to $Y^6$ each, independently of one another, denote H or F.
$X^0$ here is preferably F, Cl, $CF_3$, $OCF_3$ or $OCHF_2$. $R^0$ here preferably denotes alkyl, alkoxy, oxaalkyl, fluoroalkyl or alkenyl, each having up to 6 C atoms.

The proportion of compounds of the formulae II to VI in the mixture as a whole is 0 to 30% by weight.

In the formulae II to XIII, the moiety

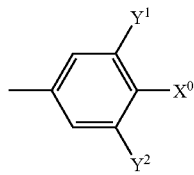

preferably denotes

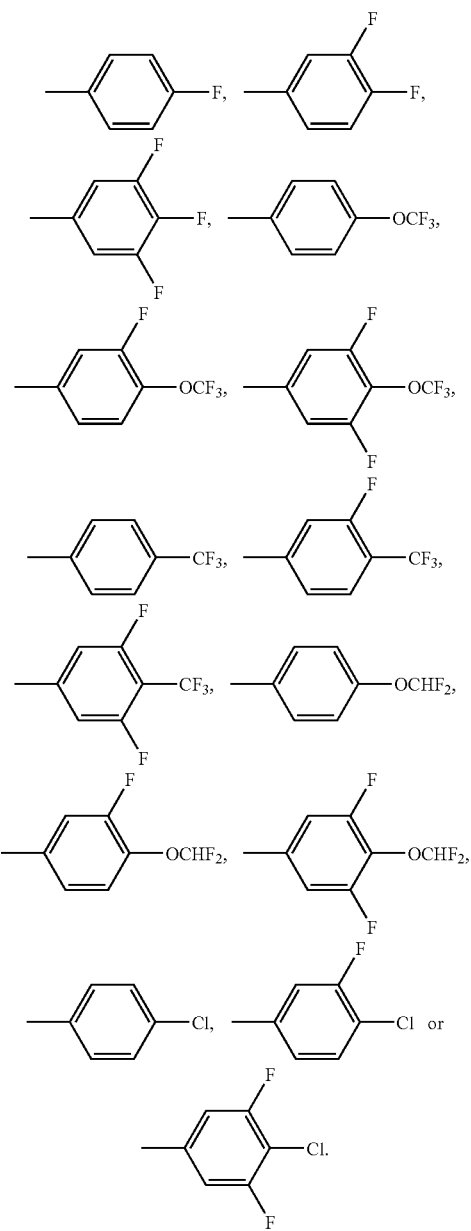

$R^0$ in all compounds is preferably straight-chain alkyl or alkenyl having 2 to 7 C atoms.

The medium comprises further compounds from the class of the fluorinated terphenyls with $R^0$ and/or $X°$, as defined below, as para-1,4‴ end groups, preferably selected from the following group consisting of compounds of the formulae XIV and XV:

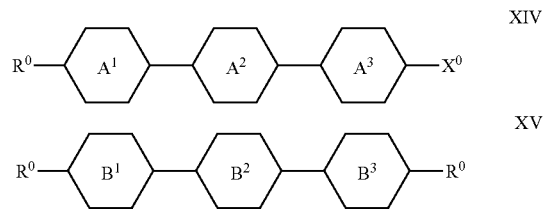

in which, independently of one another, $R^0$ denotes n-alkyl, oxaalkyl, fluoroalkyl or alkenyl, each having up to 9 C atoms, $X^0$ denotes F, Cl, halogenated alkyl, halogenated alkenyl, halogenated alkenyloxy or halogenated alkoxy having up to 6 C atoms, preferably F, Cl, $OCF_3$ or $CF_3$, and the rings $A^1$, $A^2$, $A^3$, $B^1$, $B^2$ and $B^3$, independently of one another, denote a 1,4-phenylene which is substituted by 0, 1 or 2 fluorine.

In formulae XIV and XV, at least one of the 1,4-phenylene rings is in each case preferably mono- or polysubstituted by fluorine atoms. In compounds of the formula XIV, two of the phenyl rings are preferably each substituted by at least one fluorine atom or one of the phenyl rings is substituted by two fluorine atoms; in compounds of the formula XV, one of the phenyl rings is preferably substituted by at least one fluorine atom. $X^0$ in the formulae XIV and XV is preferably F, Cl, $CF_3$, $OCF_3$ or $OCHF_2$. $R^0$ here preferably denotes alkyl, alkoxy, oxaalkyl, fluoroalkyl or alkenyl, each having up to 6 C atoms.

The compounds of the formula XIV are particularly preferably compounds of the formulae XIV-1 to XIV-5:

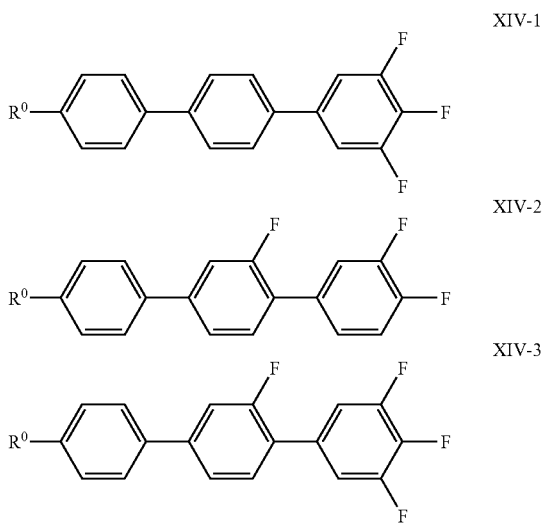

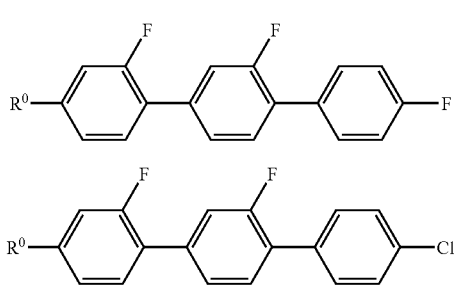

in which R⁰ is in each case, independently of one another, as defined for the formula XIV.

The proportion of the compounds of the formulae XIV and XV is preferably 0-40% by weight, in particular 2-35% by weight.

The compounds of the formula XV are particularly preferably a compound of the formulae XV-1 to XV-3:

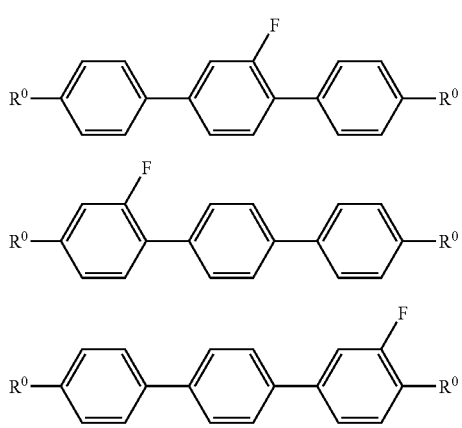

in which R⁰ is as defined for the formula XV.

The medium comprises one or more compounds selected from the following group consisting of the general formulae XVI to XVIII:

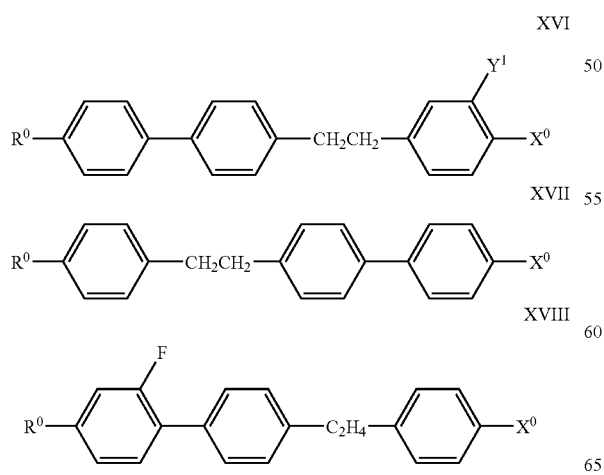

in which

R⁰ denotes n-alkyl, oxaalkyl, fluoroalkyl or alkenyl, each having up to 9 C atoms, $Y^1$ denotes H or F, and $X^0$ denotes F, Cl, halogenated alkyl, halogenated alkenyl, halogenated alkenyloxy or halogenated alkoxy having up to 6 C atoms;

the 1,4-phenylene rings may additionally be substituted by CN, chlorine or fluorine. The 1,4-phenylene rings are preferably mono- or polysubstituted by fluorine atoms.

The medium preferably comprises one or more compounds of the formulae IIa to IIg

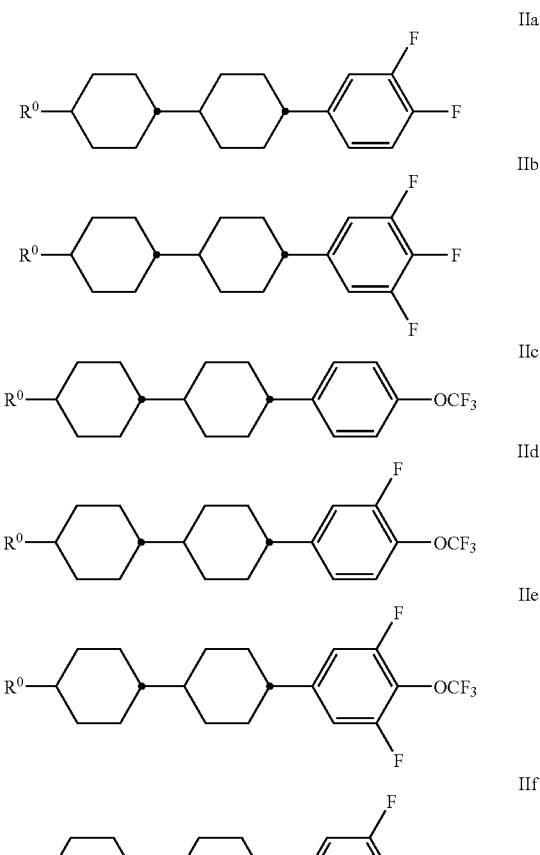

in which

R⁰ denotes n-alkyl, oxaalkyl, fluoroalkyl or alkenyl, each having up to 9 C atoms.

In the compounds of the formulae IIa-IIg, R⁰ preferably denotes methyl, ethyl, n-propyl, n-butyl or n-pentyl.

The medium preferably comprises one, two or more, preferably one or two, dioxane compounds of the formulae D-1 and/or D-2:

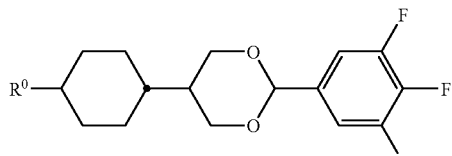

D-1

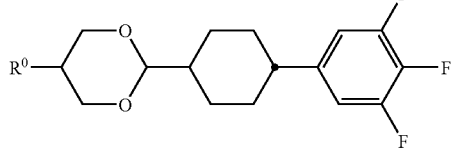

D-2 in which
R⁰ denotes n-alkyl, oxaalkyl, fluoroalkyl or alkenyl, each having up to 9 C atoms.

The proportion of the dioxane compounds D-1 and/or D-2 in the mixtures according to the invention is preferably 0-25% by weight, in particular 0-20% by weight and very particularly preferably 0-15% by weight.

The medium preferably comprises one, two or more, preferably one or two, pyran compounds of the formulae P-1 to P-4

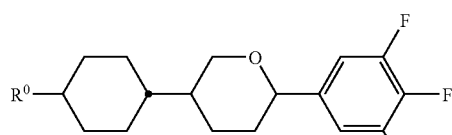

P-1

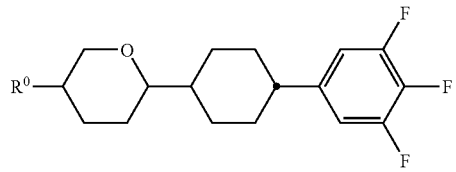

P-2

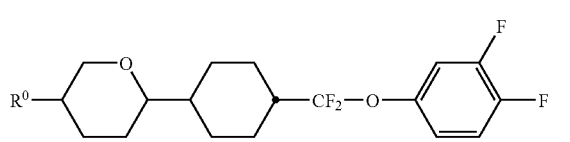

P-3

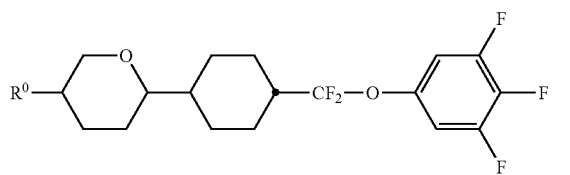

P-4 in which
R⁰ denotes n-alkyl, oxaalkyl, fluoroalkyl or alkenyl, each having up to 9 C atoms.

The medium preferably essentially consists of compounds selected from compounds of formulae I, K-1 to K-11, XIV, XV and of Z-1 to Z-11.

The medium additionally comprises one or more UV-stabilizing compounds, in particular a quaterphenyl compound. Particular preference is given to mono- or polyfluorinated quaterphenyl compounds of the formula

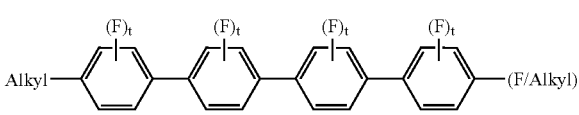

where t is in each case, independently, 0, 1 or 2, and very particularly of the formula

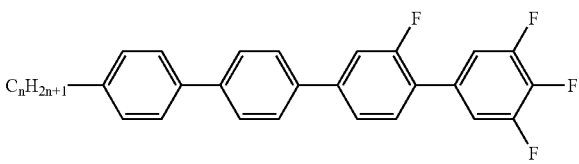

where n is 1 to 8.

The mixtures according to the invention are preferably distinguished by the fact that they have clearing points of 70° C. or more, particularly preferably 75° C. or more, and threshold voltages of 2.0 V or less and in particular 1.5 V or less and very particularly 1.2 V or less.

The mixtures according to the invention are distinguished, in particular, by the fact that they have a dielectric anisotropy $\Delta\epsilon$ of 3 or more and preferably 4 or more. In a particularly preferred embodiment, the dielectric anisotropy is 8 or more and preferably 11 or more.

It has been found that even a relatively small proportion of compounds of the formula I mixed with conventional liquid-crystal materials, but in particular with one or more compounds of the formulae K, Z, II, XIV and/or XV results in a significant reduction in the rotational viscosities and response times, with broad nematic phases having low smectic-nematic transition temperatures being observed at the same time, improving the storage stability.

The term "alkyl" or "alkyl*" encompasses straight-chain and branched alkyl groups having 1-7 carbon atoms, in particular the straight-chain groups methyl, ethyl, propyl, butyl, pentyl, hexyl and heptyl. Groups having 1-5 carbon atoms are generally preferred.

The term "alkenyl" encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic line, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I+K and Z+II+XIV+XV as well as D or P depends substantially on the desired properties, on the choice of the components and on the choice of any further components that may be present.

Suitable mixing ratios within the range indicated above can easily be determined from case to case.

The total amount of compounds of the formulae I, K and the co-components indicated in the mixtures according to the invention is not crucial. The mixtures can therefore comprise one or more further components for the purposes of optimisation of various properties. However, the observed effect on the rotational viscosity and the clearing point is generally greater, the higher the total concentration of compounds of the formula I and the co-components indicated.

The individual compounds which can be used in the media according to the invention are either known or can be prepared analogously to the known compounds.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba Speciality Chemicals, antioxidants, free-radical scavengers, etc. For example, 0-15% of pleochroic dyes or chiral dopants can be added. Suitable stabilisers and dopants are mentioned below in Tables C and D.

C denotes a crystalline phase, S a smectic phase, $S_c$ a smectic C phase, N a nematic phase and I the isotropic phase.

The threshold voltage $V_{10}$ denotes the voltage for 10% transmission (viewing angle perpendicular to the plate surface). An denotes the optical anisotropy. $\Delta\epsilon$ denotes the dielectric anisotropy ($\Delta\epsilon=\epsilon_\parallel-\epsilon_\perp$, where $\epsilon_\parallel$ denotes the dielectric constant parallel to the longitudinal molecular axes and $\epsilon_\perp$ denotes the dielectric constant perpendicular thereto). The electro-optical data are measured in a TN cell with a 90° twist at the 1st minimum (i.e. at a d·Δn value of 0.5 μm) at 20° C., unless expressly stated otherwise. The optical data are measured at 20° C., unless expressly stated otherwise. In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| n0m | $C_nH_{2n+1}$ | $OC_mH_{2m+1}$ | H | H |
| n0.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nCl | $C_nH_{2n+1}$ | Cl | H | H |
| nCl.F | $C_nH_{2n+1}$ | Cl | F | H |
| nCl.F.F | $C_nH_{2n+1}$ | Cl | F | F |
| n0F | $OC_nH_{2n+1}$ | F | H | H |
| nF | $C_nH_{2n+1}$ | F | H | H |
| nF.F | $C_nH_{2n+1}$ | F | F | H |
| nF.F.F | $C_nH_{2n+1}$ | F | F | F |
| nmF | $C_nH_{2n+1}$ | $C_mH_{2m+1}$ | F | H |
| nOCF3 | $C_nH_{2n+1}$ | $OCF_3$ | H | H |
| nOCF3.F | $C_nH_{2n+1}$ | $OCF_3$ | F | H |
| nOCF3.F.F | $C_nH_{2n+1}$ | $OCF_3$ | F | F |
| nCF3 | $C_nH_{2n+1}$ | $CF_3$ | H | H |
| nCF3.F | $C_nH_{2n+1}$ | $CF_3$ | F | H |
| nCF3.F.F | $C_nH_{2n+1}$ | $CF_3$ | F | F |

-continued
| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| n0CF2 | $C_nH_{2n+1}$ | $OCHF_2$ | H | H |
| n0CF2.F | $C_nH_{2n+1}$ | $OCHF_2$ | F | H |
| n0CF2.F.F | $C_nH_{2n+1}$ | $OCHF_2$ | F | F |
| n-Vm | $C_nH_{2n+1}$ | $-CH=CH-C_mH_{2m+1}$ | H | H |
| nV-Vm | $C_nH_{2n+1}-CH=CH-$ | $-CH=CH-C_mH_{2m+1}$ | H | H |
Preferred mixture components are given in Tables A and B.
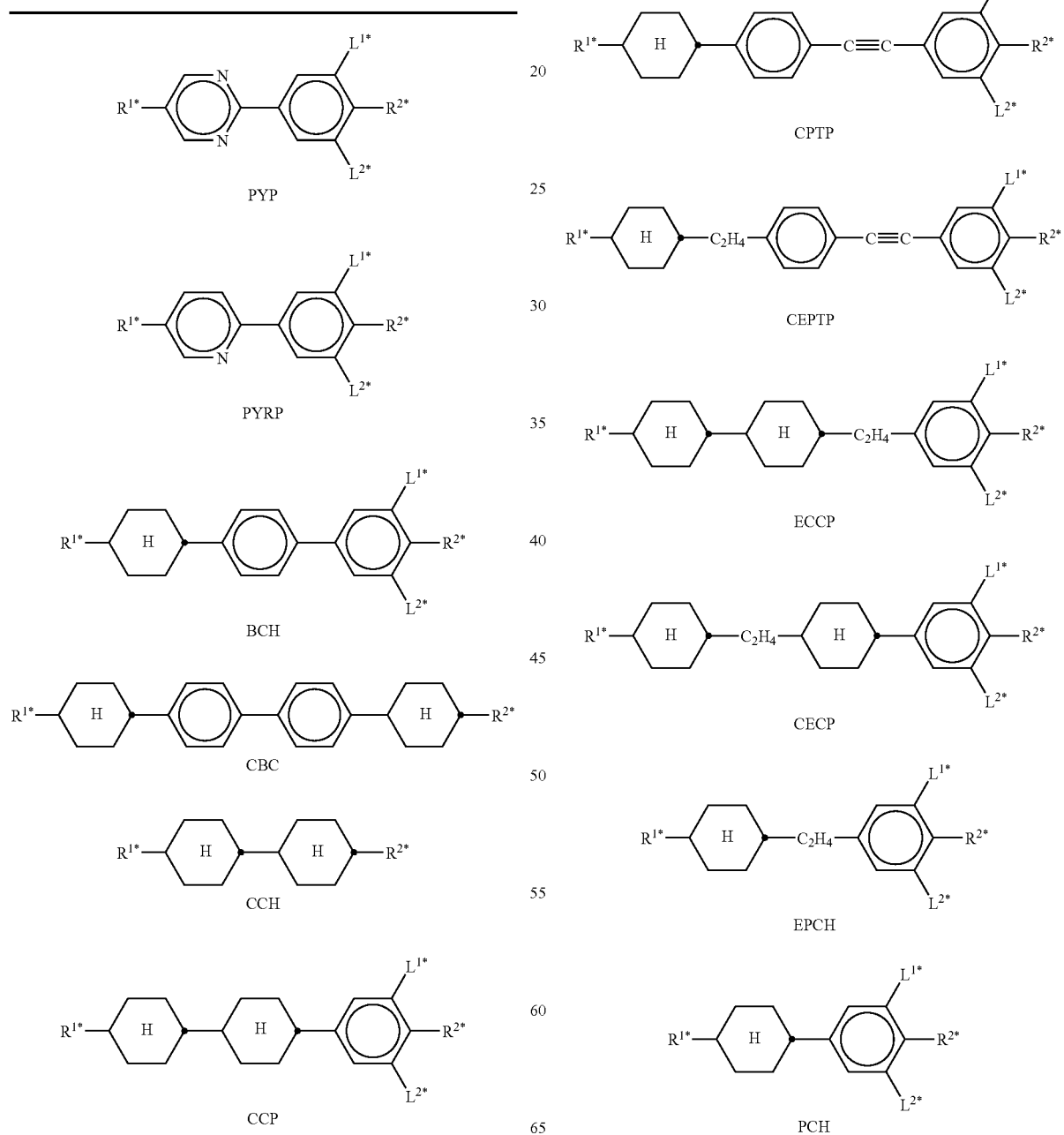

TABLE A-continued

PTP, BECH, EBCH, CPC, B

TABLE A-continued

FET-nF, CGG, CGU, CFU

TABLE B

BCH-n.Fm, CFU-n-F, CBC-nmF

TABLE B-continued
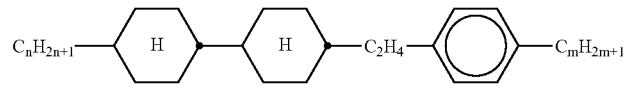
ECCP-nm
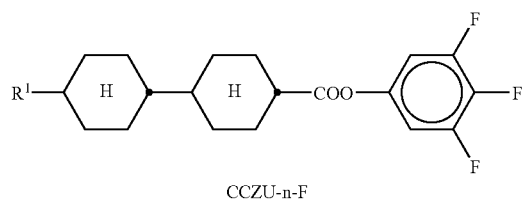
CCZU-n-F
PGP-n-m
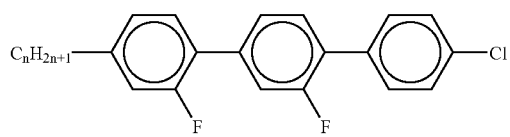
GGP-n-Cl
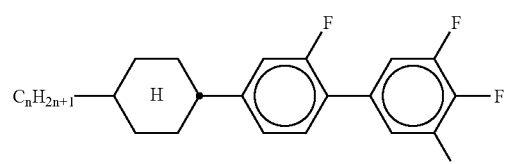
CGU-n-F
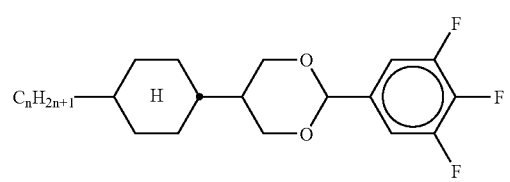
CDU-n-F
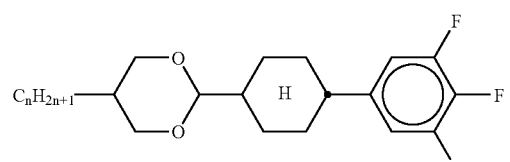
DCU-n-F
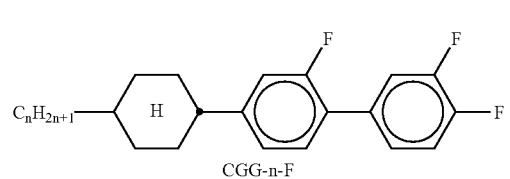
CGG-n-F TABLE B-continued
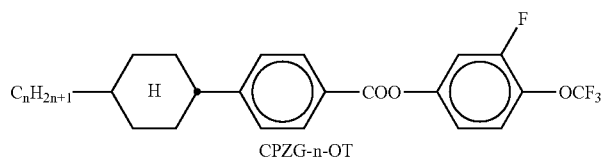
CPZG-n-OT
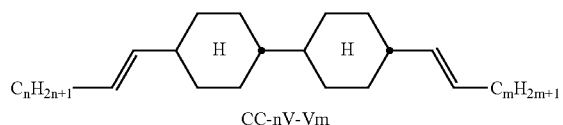
CC-nV-Vm
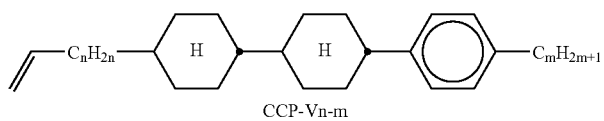
CCP-Vn-m
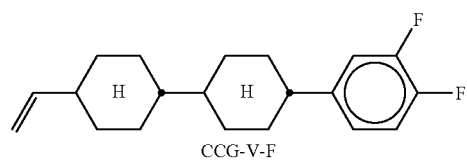
CCG-V-F
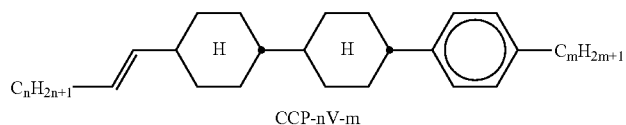
CCP-nV-m
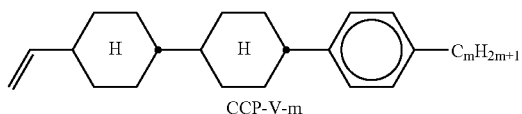
CCP-V-m
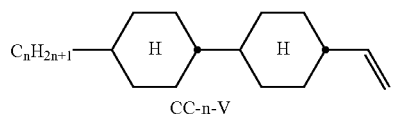
CC-n-V
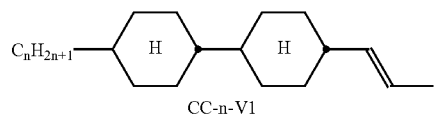
CC-n-V1
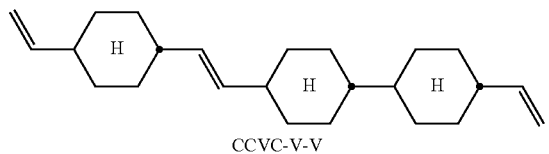
CCVC-V-V
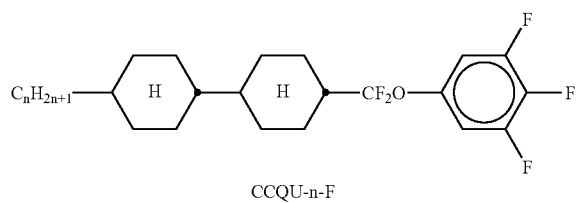
CCQU-n-F TABLE B-continued
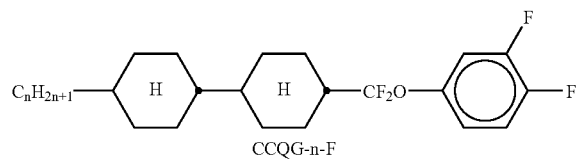
CCQG-n-F
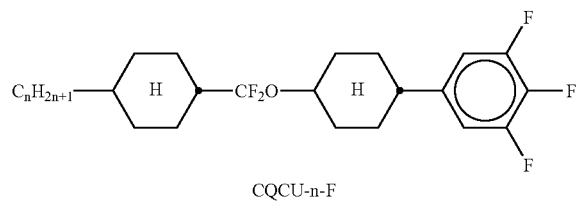
CQCU-n-F
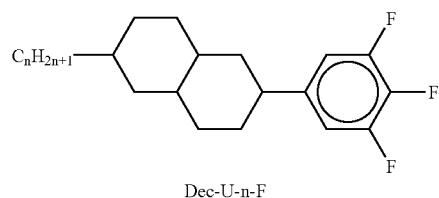
Dec-U-n-F
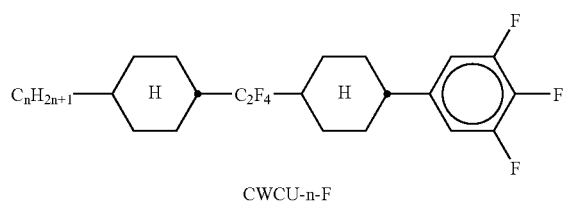
CWCU-n-F
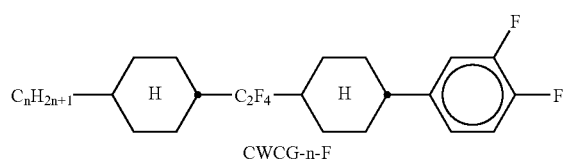
CWCG-n-F
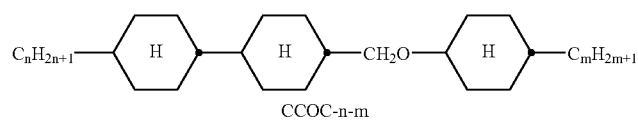
CCOC-n-m
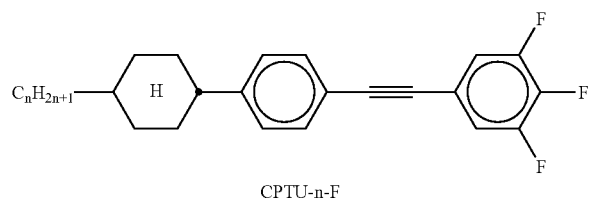
CPTU-n-F
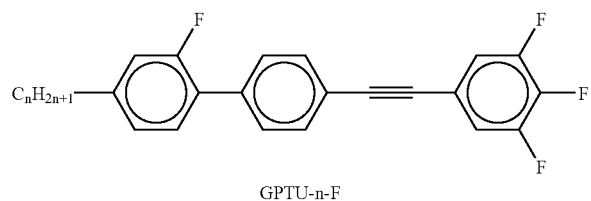
GPTU-n-F TABLE B-continued
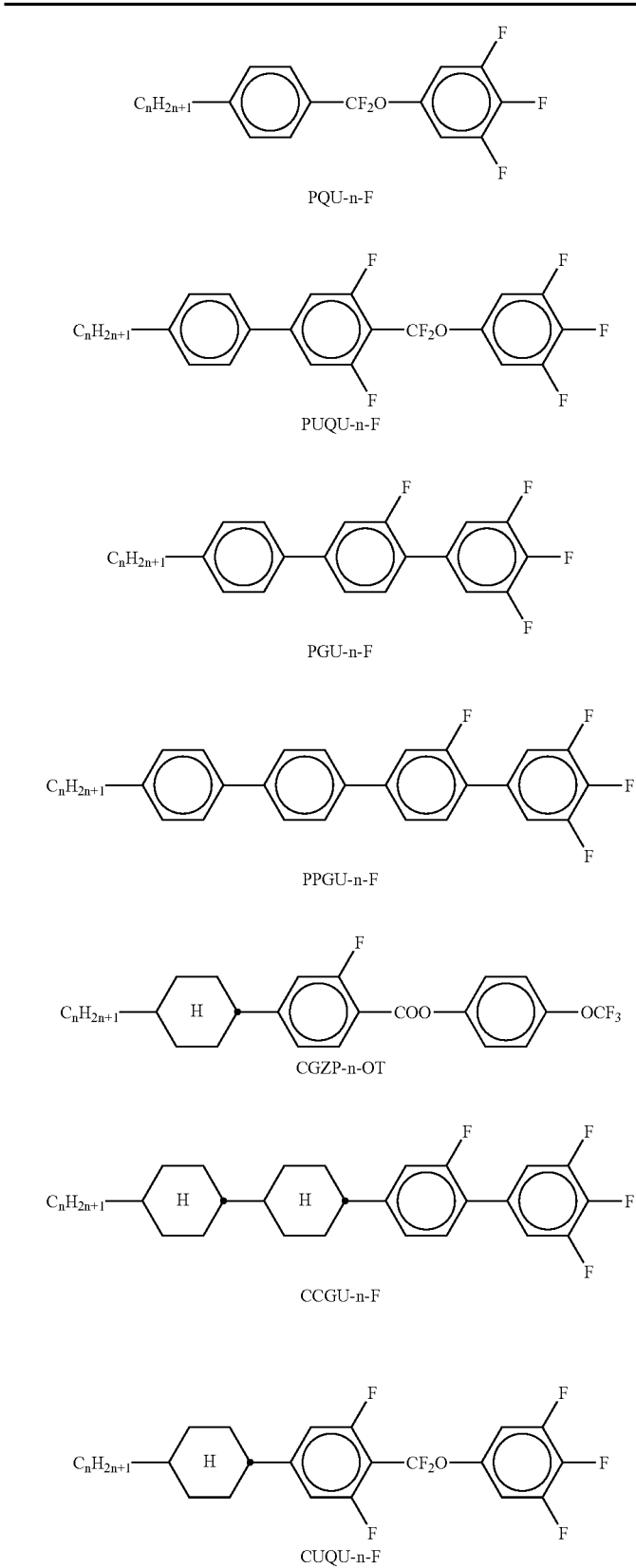

TABLE B-continued

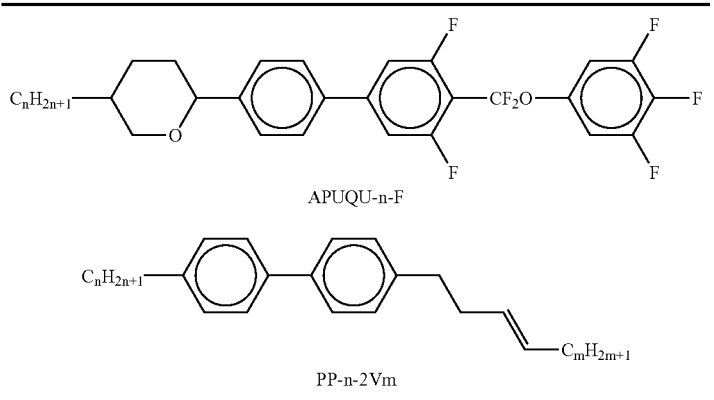

APUQU-n-F

PP-n-2Vm

Particular preference is given to liquid-crystalline mixtures which, besides the compounds of the formula I, comprise at least one, two, three or four compounds from Table B.

TABLE C

Table C indicates possible dopants which are generally added to the mixtures according to the invention. The mixtures preferably comprise 0-10% by weight, in particular 0.01-5% by weight and particularly preferably 0.01-3% by weight of dopants.

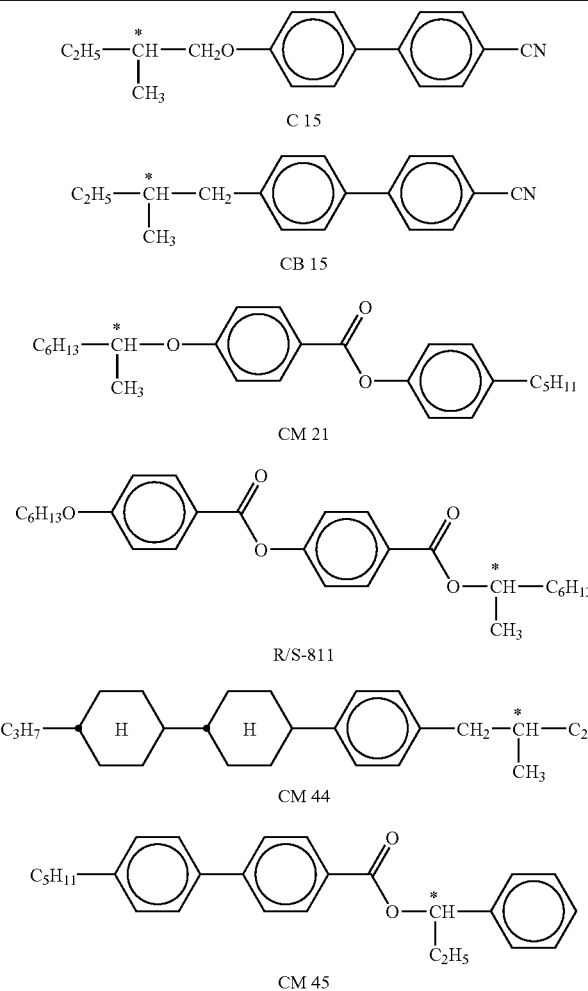

C 15

CB 15

CM 21

R/S-811

CM 44

CM 45

TABLE C-continued
Table C indicates possible dopants which are generally added to the mixtures according to the invention. The mixtures preferably comprise 0-10% by weight, in particular 0.01-5% by weight and particularly preferably 0.01-3% by weight of dopants.
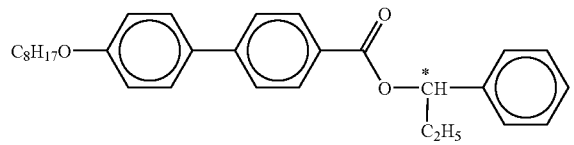
CM 47
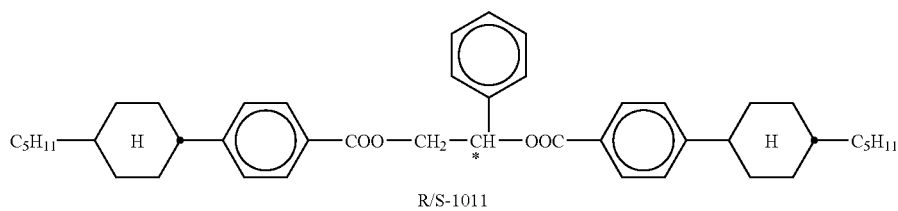
R/S-1011
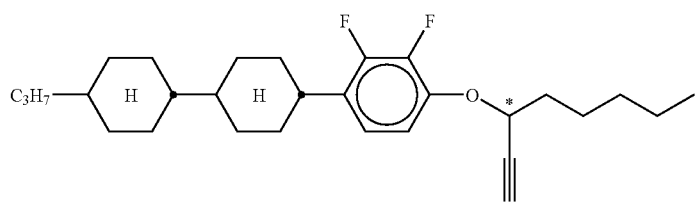
R/S-3011
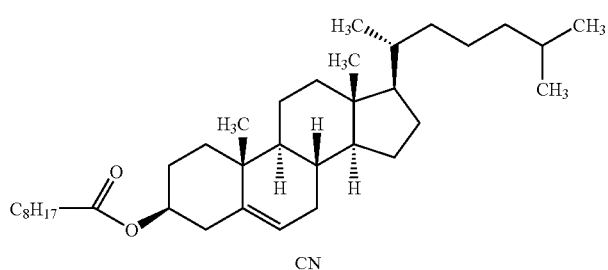
CN
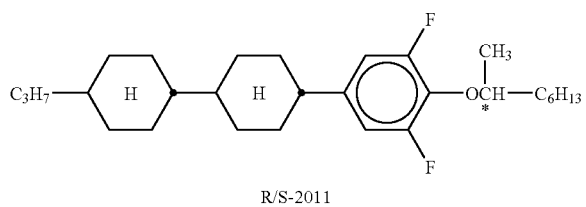
R/S-2011
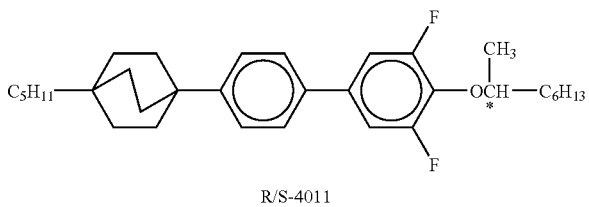
R/S-4011

TABLE C-continued

Table C indicates possible dopants which are generally added to the mixtures according to the invention. The mixtures preferably comprise 0-10% by weight, in particular 0.01-5% by weight and particularly preferably 0.01-3% by weight of dopants.

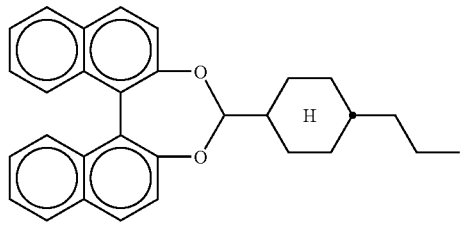

R/S-5011

TABLE D

Stabilisers which can be added, for example, to the mixtures according to the invention are mentioned below.

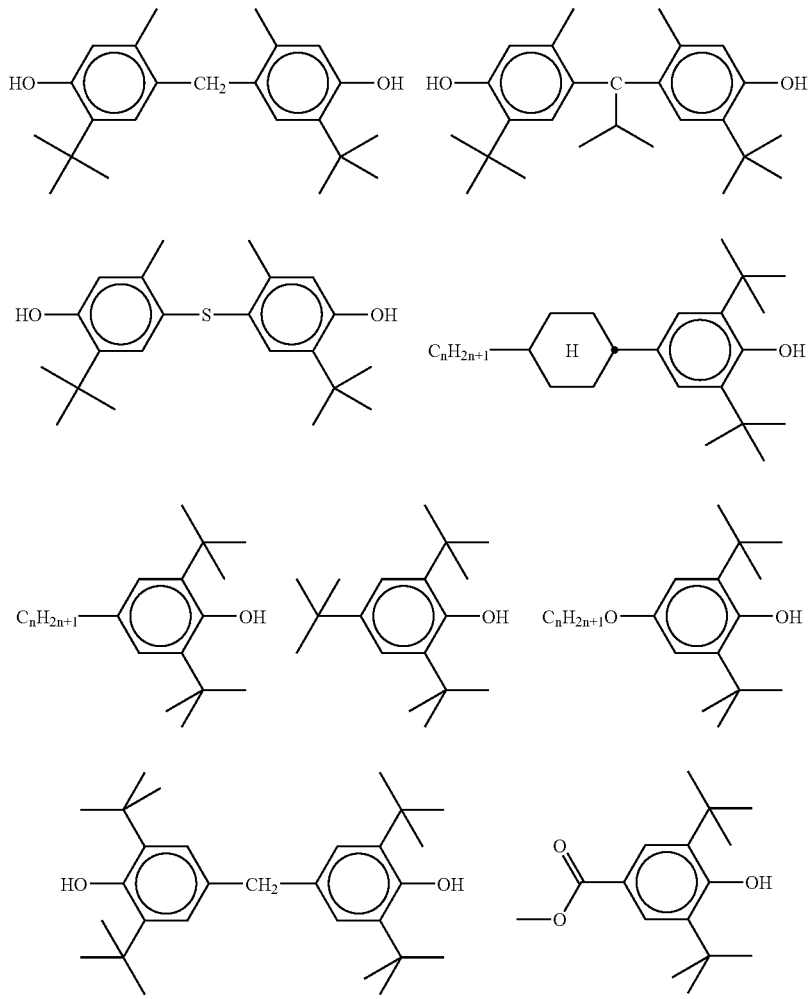

TABLE D-continued
Stabilisers which can be added, for example, to the mixtures according to
the invention are mentioned below.
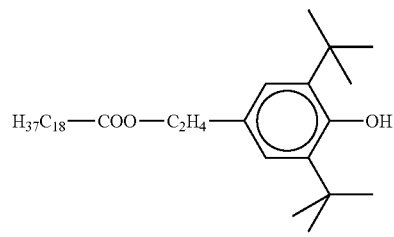
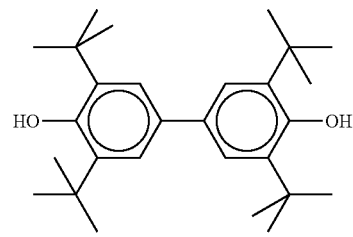
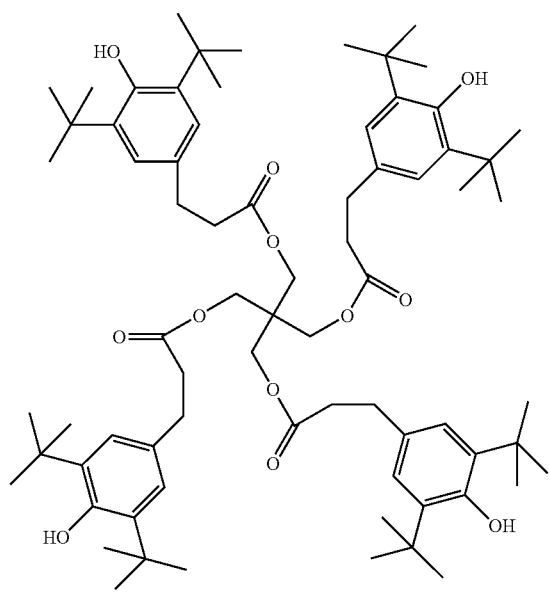
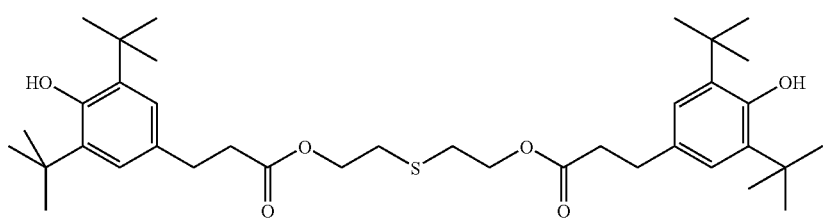
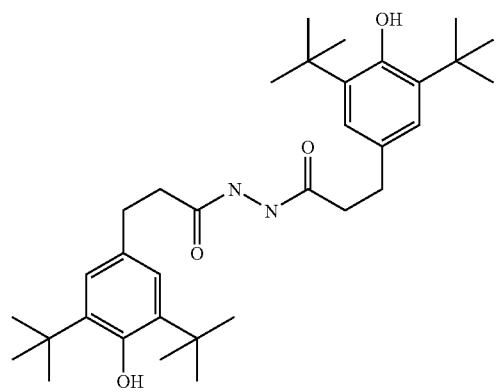

TABLE D-continued
Stabilisers which can be added, for example, to the mixtures according to the invention are mentioned below.
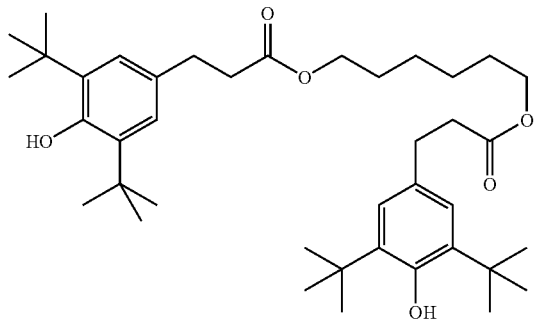
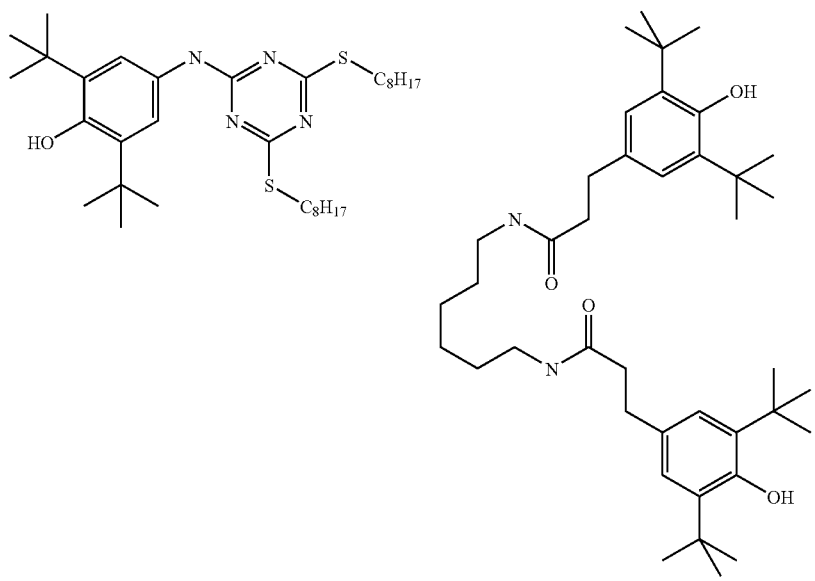
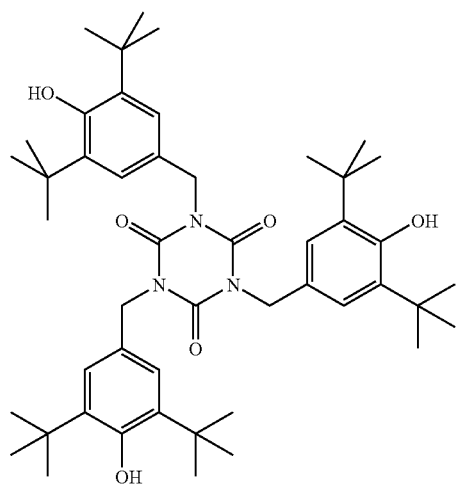

TABLE D-continued
Stabilisers which can be added, for example, to the mixtures according to the invention are mentioned below.
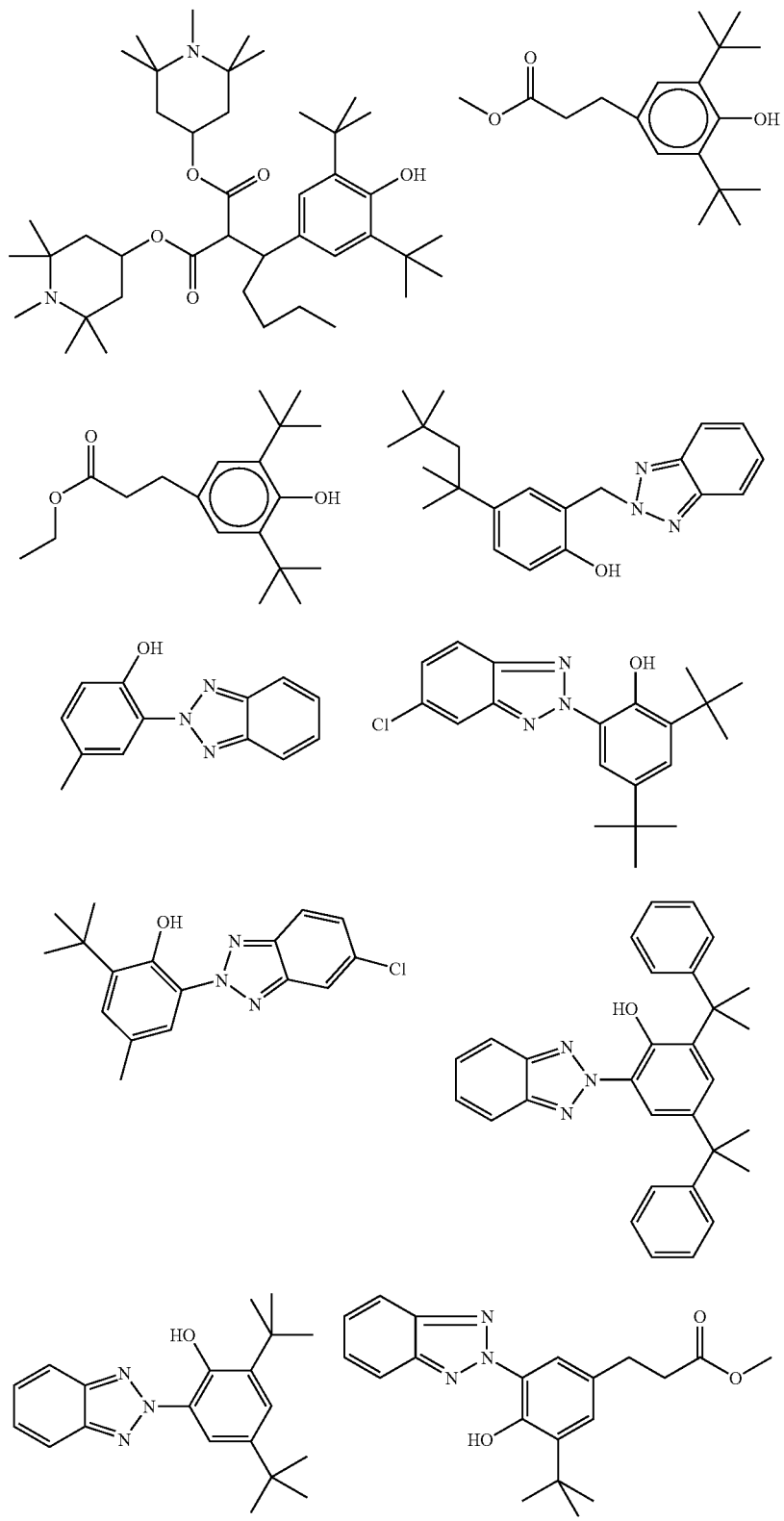

TABLE D-continued
Stabilisers which can be added, for example, to the mixtures according to the invention are mentioned below.
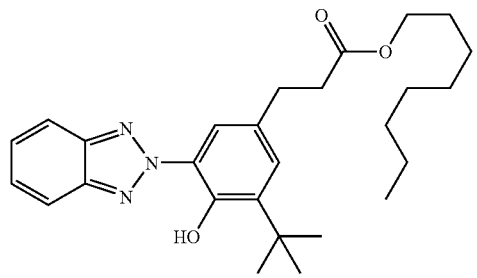
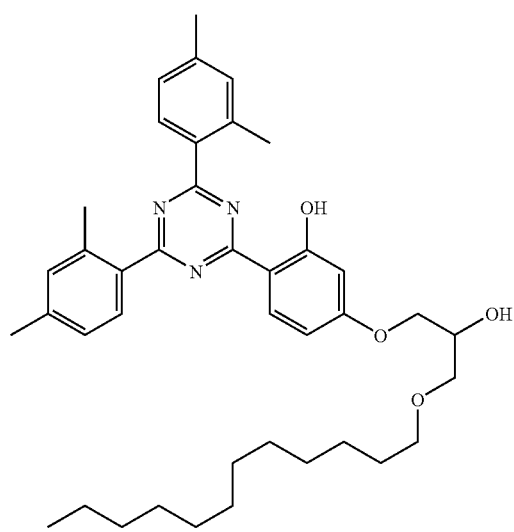
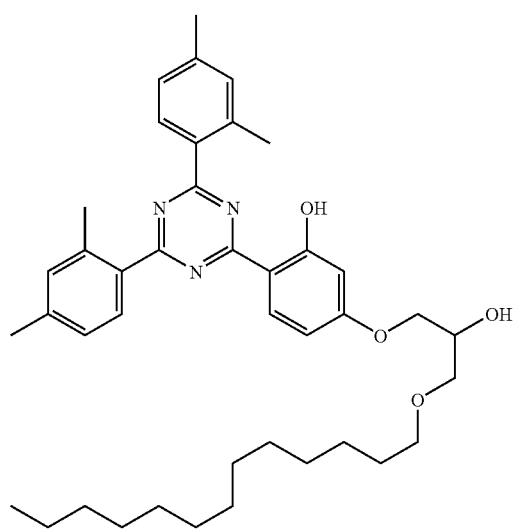

TABLE D-continued

Stabilisers which can be added, for example, to the mixtures according to the invention are mentioned below.

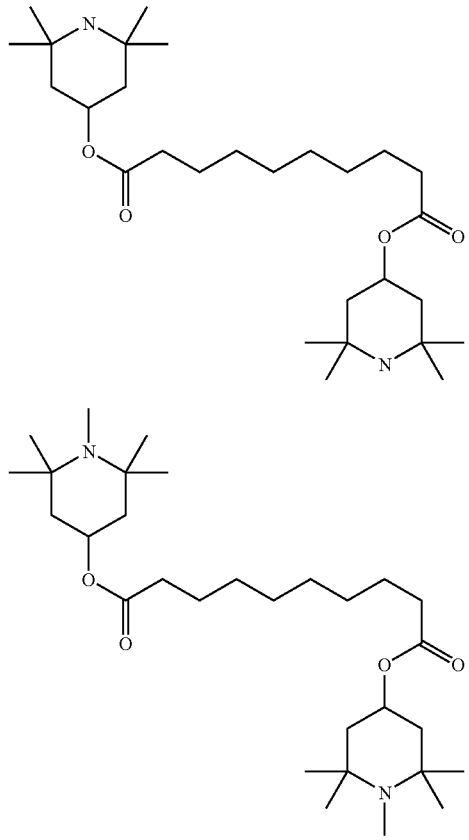

The following examples explain the invention without intending to restrict it. Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Δn denotes optical anisotropy (589 nm, 20° C.), Δε the dielectric anisotropy (1 kHz, 20° C.). The flow viscosity $v_{20}$ (mm²/sec) and the rotational viscosity $\gamma_1$ (mPa·s) were in each case determined at 20° C.

The physical measurement methods are described in "Merck Liquid Crystals, Physical Properties of Liquid Crystals", November 1997, Merck KGaA.

MIXTURE EXAMPLE 1

| Composition: | | Properties: | |
|---|---|---|---|
| CCP-20CF3 | 3.0% | Clearing point/° C.: | 73.0 |
| CCP-30CF3 | 4.0% | $n_e$ [589 nm, 20° C.]: | 1.5979 |
| PGU-2-F | 2.0% | Δn [589 nm, 20° C.]: | 0.1069 |
| PGU-3-F | 9.0% | $\varepsilon_\parallel$ [1 kHz, 20° C.]: | 7.4 |
| PUQU-3-F | 8.0% | Δε [1 kHz, 20° C.]: | +4.4 |
| CC-3-V1 | 13.0% | $\gamma_1$/mPa · s [20° C.]: | 57 |
| CC-3-V | 18.0% | $k_{11}$/pN [20° C.]: | 12.8 |
| PCH-301 | 11.0% | $K_{33}$/pN [20° C.]: | 13.4 |
| CCP-V-1 | 12.0% | TN, 90° (d · Δn = 0.50 μm) | |
| CCGU-3-F | 2.0% | $V_{10}$/V [20° C.]: | 1.98 |
| PP-1-2V1 | 10.0% | $V_{90}$/$V_{10}$ [20° C.]: | 1.50 |
| CCVC-V-V | 8.0% | | |
| Σ | 100.0% | | |

MIXTURE EXAMPLE 2

| Composition: | | Properties: | |
|---|---|---|---|
| CCP-20CF3 | 3.0% | Clearing point/° C.: | 73.0 |
| CCP-30CF3 | 4.0% | $n_e$ [589 nm, 20° C.]: | 1.5977 |
| PGU-2-F | 2.0% | Δn [589 nm, 20° C.]: | 0.1071 |
| PGU-3-F | 9.0% | $\varepsilon_\parallel$ [1 kHz, 20° C.]: | 7.3 |
| PUQU-3-F | 8.0% | Δε [1 kHz, 20° C.]: | +4.4 |
| CC-3-V1 | 13.0% | $\gamma_1$/mPa · s [20° C.]: | 55 |
| CC-3-V | 18.0% | $k_{11}$/pN [20° C.]: | 12.7 |
| PCH-301 | 11.0% | $K_{33}$/pN [20° C.]: | 13.4 |
| CCP-V-1 | 10.0% | TN, 90° (d · Δn = 0.50 μm) | |
| CCGU-3-F | 2.0% | $V_{10}$/V [20° C.]: | 1.97 |

-continued

| Composition: | | Properties: | |
|---|---|---|---|
| PP-1-2V1 | 10.0% | $V_{90}/V_{10}$ [20° C.]: | 1.50 |
| CCVC-V-V | 10.0% | | |
| Σ | 100.0% | | |

MIXTURE EXAMPLE 3

| Composition: | | Properties: | |
|---|---|---|---|
| GGP-3-CL | 7.0% | Clearing point/° C.: | 76.5 |
| GGP-5-CL | 5.5% | $n_e$ [589 nm, 20° C.]: | 1.6213 |
| PGU-2-F | 5.0% | Δn [589 nm, 20° C.]: | 0.1264 |
| PGU-3-F | 5.0% | $\epsilon_\parallel$ [1 kHz, 20° C.]: | 7.7 |
| PUQU-2-F | 4.0% | Δε [1 kHz, 20° C.]: | +4.5 |
| PUQU-3-F | 3.0% | $\gamma_1$/mPa · s [20° C.]: | 59 |
| CCP-V2-1 | 2.0% | $k_{11}$/pN [20° C.]: | 12.5 |
| CBC-33 | 2.0% | $K_{33}$/pN [20° C.]: | 12.1 |
| CC-3-V1 | 1.0% | TN, 90° (d · Δn = 0.50 μm) | |
| PGP-2-3 | 6.0% | $V_{10}$/V [20° C.]: | 1.86 |
| PGP-2-4 | 6.0% | $V_{90}/V_{10}$ [20° C.]: | 1.47 |
| CC-3-V | 44.0% | | |
| CCVC-V-V | 8.0% | | |
| PP-1-2V1 | 1.5% | | |
| Σ | 100.0% | | |

MIXTURE EXAMPLE 4

| Composition: | | Properties: | |
|---|---|---|---|
| CC-3-V | 20.0% | Clearing point/° C.: | 78.0 |
| CCG-V-F | 3.0% | $n_e$ [589 nm, 20° C.]: | 1.5843 |
| CCP-V-1 | 19.0% | Δn [589 nm, 20° C.]: | 0.1000 |
| CCQU-2-F | 7.0% | $\epsilon_\parallel$ [1 kHz, 20° C.]: | 13.6 |
| CCQU-3-F | 12.0% | Δε [1 kHz, 20° C.]: | +9.9 |
| PUQU-2-F | 13.0% | $\gamma_1$/mPa · s [20° C.]: | 76 |
| PUQU-3-F | 15.0% | $k_{11}$/pN [20° C.]: | 12.2 |
| PGP-2-4 | 4.0% | $K_{33}$/pN [20° C.]: | 12.2 |
| CCVC-V-V | 7.0% | TN, 90° (d · Δn = 0.50 μm) | |
| Σ | 100.0% | $V_{10}$/V [20° C.]: | 1.27 |
| | | $V_{90}/V_{10}$ [20° C.]: | 1.54 |

MIXTURE EXAMPLE 5

| Composition: | | Properties: | |
|---|---|---|---|
| CDU-2-F | 3.5% | Clearing point/° C.: | 74.0 |
| PGU-2-F | 9.0% | $n_e$ [589 nm, 20° C.]: | 1.5842 |
| PUQU-2-F | 7.5% | Δn [589 nm, 20° C.]: | 0.0982 |
| PUQU-3-F | 8.0% | $\epsilon_\parallel$ [1 kHz, 20° C.]: | 12.0 |
| CCP-V-1 | 10.5% | Δε [1 kHz, 20° C.]: | +8.5 |
| CCP-V2-1 | 9.0% | $\gamma_1$/mPa · s [20° C.]: | 59 |
| CC-3-V1 | 12.5% | | |
| CC-3-V | 29.0% | | |
| APUQU-2-F | 8.0% | | |
| CCVC-V-V | 3.0% | | |
| Σ | 100.0% | | |

MIXTURE EXAMPLE 6

| Composition: | | Properties: | |
|---|---|---|---|
| CCP-30CF3 | 8.0% | Clearing point/° C.: | 79.0 |
| PGU-2-F | 9.0% | $n_e$ [589 nm, 20° C.]: | 1.5975 |
| PGU-3-F | 3.5% | Δn [589 nm, 20° C.]: | 0.1108 |
| PUQU-2-F | 9.0% | $\epsilon_\parallel$ [1 kHz, 20° C.]: | 14.7 |
| PUQU-3-F | 9.5% | Δε [1 kHz, 20° C.]: | +11.1 |
| CC-3-V1 | 12.0% | $\gamma_1$/mPa · s [20° C.]: | 74 |
| CC-3-V | 19.0% | $k_{11}$/pN [20° C.]: | 12.4 |
| CCP-V-1 | 11.0% | $K_{33}$/pN [20° C.]: | 13.6 |
| CCP-V2-1 | 7.0% | IPS | |
| APUQU-2-F | 9.0% | $V_0$/V [20° C.]: | 1.11 |
| CCVC-V-V | 3.0% | | |
| Σ | 100.0% | | |

The entire disclosures of all applications, patents and publications, cited herein and of corresponding German application No. 10 2006 011 204.0, filed Mar. 20, 2006 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium of positive dielectric anisotropy comprising one or more compounds of formula I

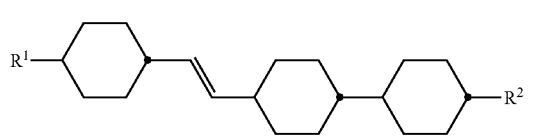

I wherein
R¹ and R² are, independently of one another, $(CH_2)_n$—CH=CH—$(CH_2)_m$H, wherein n and m, independently of one another, are an integer of 0 to 5
and one or more compounds of formulae K-1, K-2, K-3, K-4, K-5, K-6, K-7, K-8, K-9, K-10, and/or K-11:

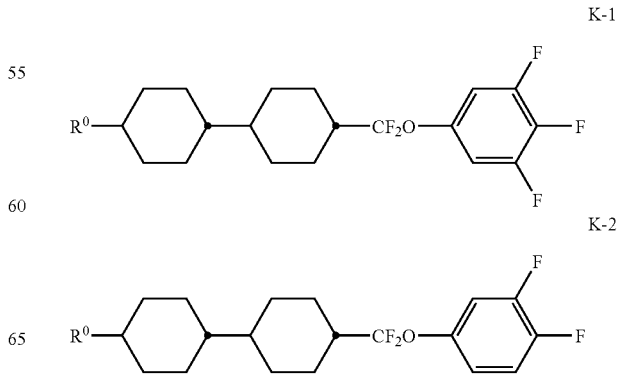

-continued
K-3
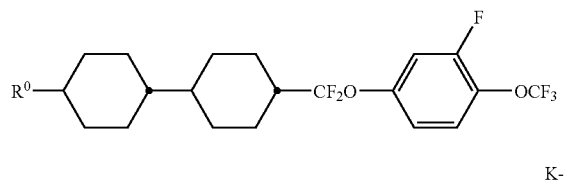
K-4
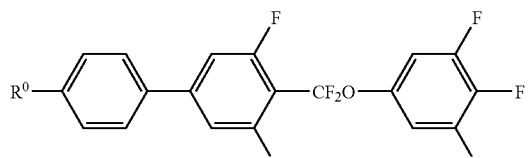
K-5
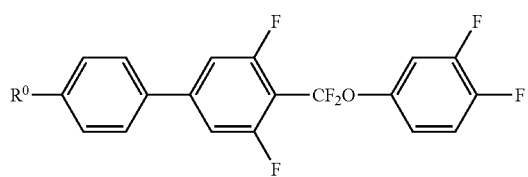
K-6
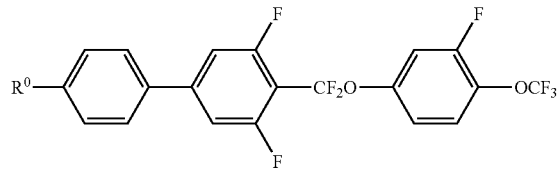
K-7
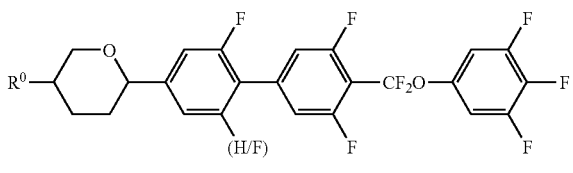
K-8
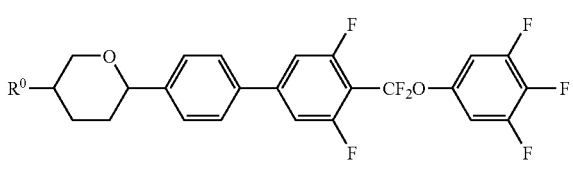
K-9
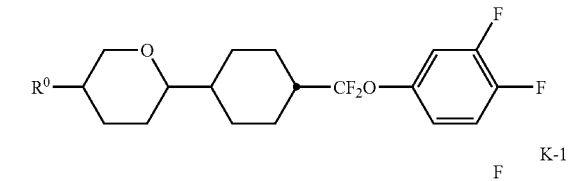
K-10
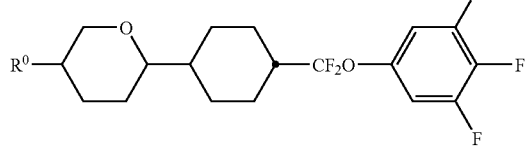
-continued
K-11
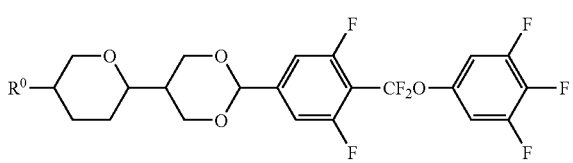
in which
R⁰ is n-alkyl, oxaalkyl, fluoroalkyl or alkenyl, each having up to 9 C atoms.
2. A liquid-crystalline medium according to claim 1, comprising one or more compounds of formulae I-1, I-2, I-3, I-4, I-5, I-6, I-7, I-8, I-9, I-10, and/or I-11:
I-1
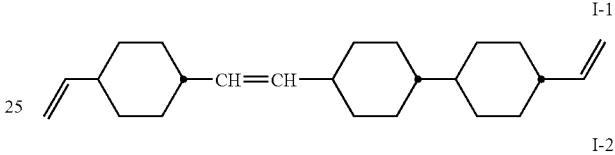
I-2
I-3
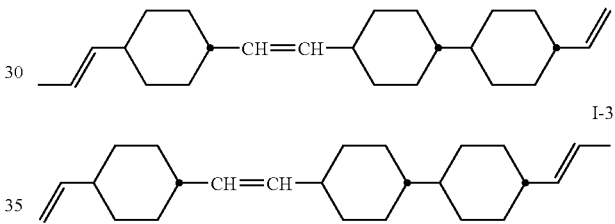
I-4
I-5
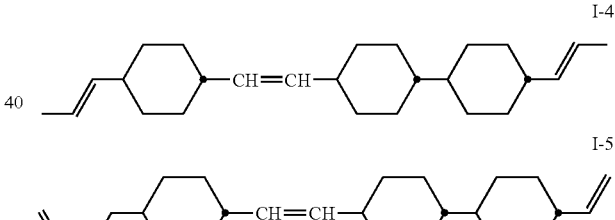
I-6
I-7
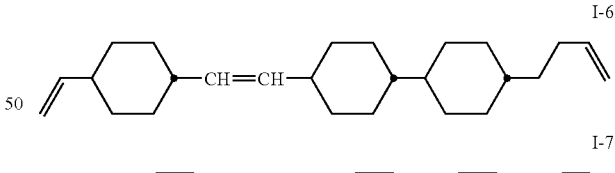
I-8
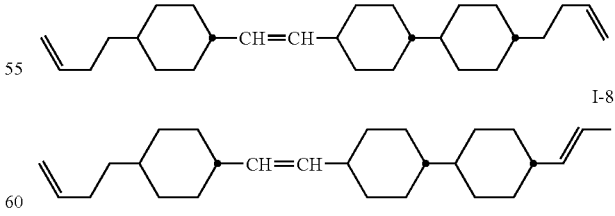
I-9
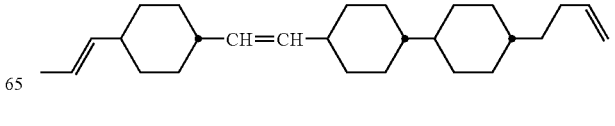

-continued

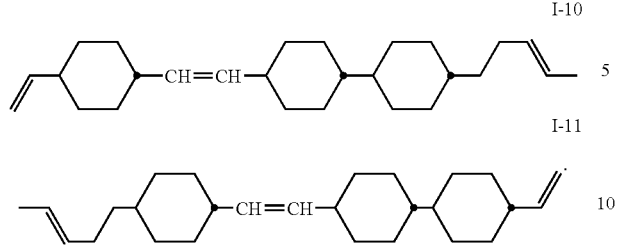

3. A liquid-crystalline medium according to claim 1, further comprising one or more compounds of formulae Z-1, Z-2, Z-3, Z-4, Z-5, Z-6, Z-7, Z-8, Z-9, Z-10, and/or Z-11:

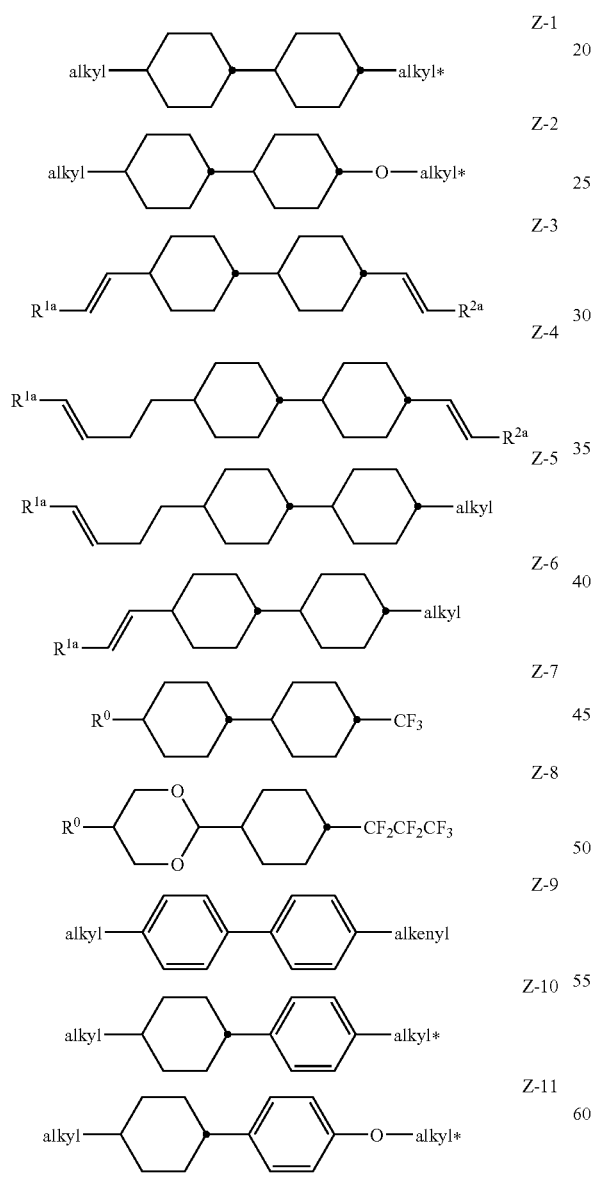

in which

R$^{1a}$ and R$^{2a}$ are, each independently of one another, H, CH$_3$, C$_2$H$_5$ or n-C$_3$H$_7$, R$^0$ is n-alkyl, oxaalkyl, fluoroalkyl or alkenyl, each having up to 9 C atoms, alkyl and alkyl* are, each independently of one another, an unsubstituted n-alkyl radical having 1 to 7 C atoms, and alkenyl is an unsubstituted alkenyl radical having 2-7 C atoms.

4. A liquid-crystalline medium according to claim 1, further comprising one or more compounds of formulae II, III, IV, V and/or VI:

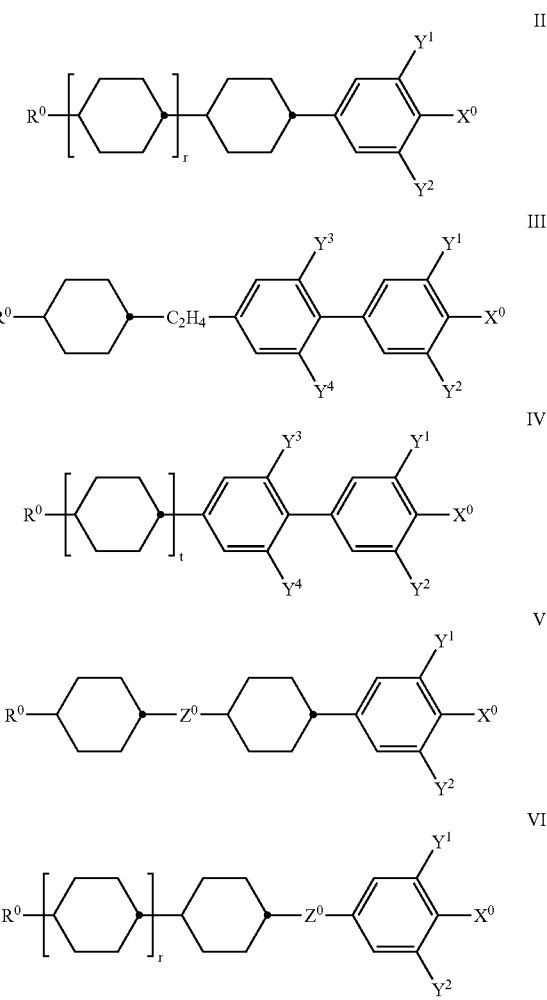

in which

R$^0$ is n-alkyl, oxaalkyl, fluoroalkyl or alkenyl, each having up to 9 C atoms, X$^0$ is F, Cl, halogenated alkyl, halogenated alkenyl, halogenated alkenyloxy or halogenated alkoxy, each having up to 6 C atoms, Z$^0$ is —C$_2$F$_4$—, —CF=CF—, —C$_2$H$_4$—, —(CH$_2$)$_4$—, —OCH$_2$—, or —CH$_2$—

Y$^1$ to Y$^4$ are, each independently of one another, H or F, r is 0 or 1, and t is 0, 1 or 2.

5. A liquid-crystalline medium according to claim 1, further comprising one or more compounds of formulae XIV and/or XV:

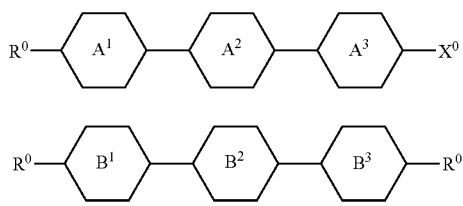

in which

R⁰ is n-alkyl, oxaalkyl, fluoroalkyl or alkenyl, each having up to 9 C atoms,

X⁰ is F, Cl, halogenated alkyl, halogenated alkenyl, halogenated alkenyloxy or halogenated alkoxy having up to 6 C atoms, and rings $A^1$, $A^2$, $A^3$, $B^1$, $B^2$, and $B^3$ are, each independently of one another, 1,4-phenylene substituted by 0, 1 or 2 fluorine atoms, wherein at least one of the 1,4-phenylene rings in each compound is mono- or polysubstituted by fluorine.

6. A liquid-crystalline medium according to claim 1, further comprising one or more compounds of formulae IIa, IIb, IIc, IId, IIe, IIf and/or IIg

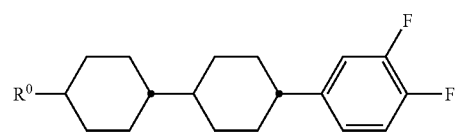

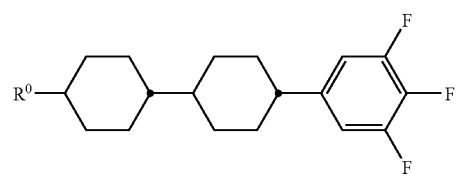

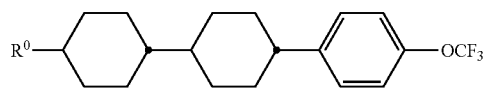

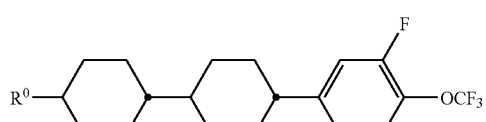

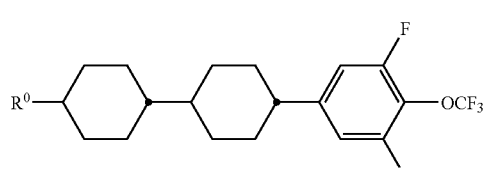

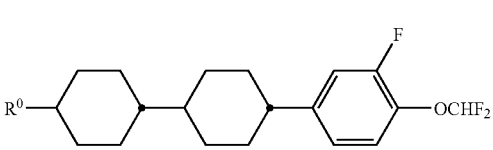

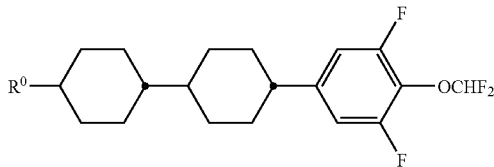

in which R⁰ is n-alkyl, oxaalkyl, fluoroalkyl or alkenyl, each having up to 9 C atoms.

7. A liquid-crystalline medium according to claim 1, further comprising one or more dioxane compounds of formulae D1 and/or D2

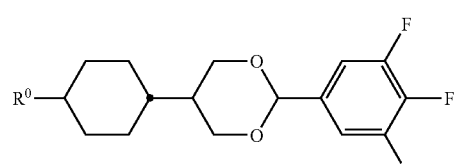

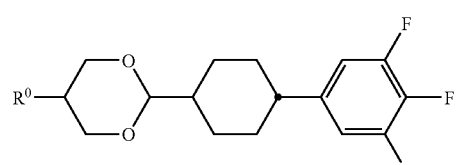

in which R⁰ is n-alkyl, oxaalkyl, fluoroalkyl or alkenyl, each having up to 9 C atoms.

8. A process for preparing a liquid-crystalline medium according to claim 1, comprising mixing a compound or a plurality of compounds of formula I together with one or more compounds of formulae K-1, K-2, K-3, K-4, K-5, K-6, K-7, K-8, K-9, K-10, and K-11.

9. An electro-optical liquid-crystal display comprising a liquid-crystalline medium according to claim 1.

10. An electro-optical liquid-crystal display according to claim 9, which is a TN or IPS display.

11. A process for preparing an electro-optical liquid-crystalline display according to claim 9, comprising puffing said liquid-crystalline medium into said display.

12. A liquid-crystalline medium according to claim 1, wherein n is 0 and m is an integer of 0 to 2.

13. A liquid-crystalline medium according to claim 1, wherein n and m, independently of one another are an integer of 0 to 2.

14. A liquid-crystalline medium of positive dielectric anisotropy comprising one or more compounds of formula I

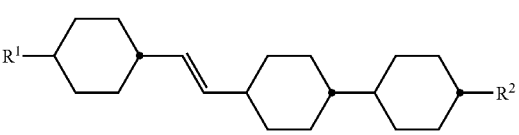

wherein

R¹ is acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl, or 9-methacryloyloxynonyl, R² is an alkenyl radical having up to 15 C atoms which is unsubstituted, monosubstituted by CN or CF₃ or monosubstituted or polysubstituted by halogen, in which one or more CH₂ groups are optionally replaced by —O—, —S—, —C≡C—, —CH=CH—, —(CO)O— or —O(CO)— in such a way that O atoms are not linked directly to one another, and one or more compounds of formulae K-1, K-2, K-3, K-4, K-5, K-6, K-7, K-8, K-9, K-10, and/or K-11:

K-1
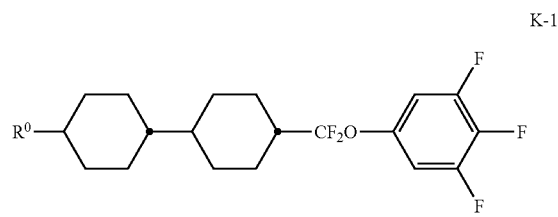

K-2
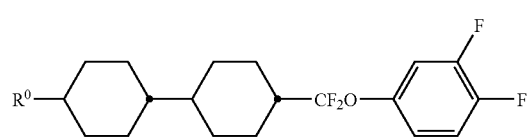

K-3
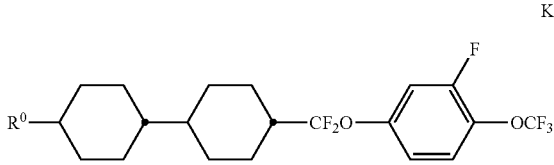

K-4
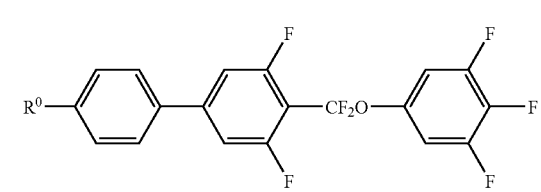

K-5
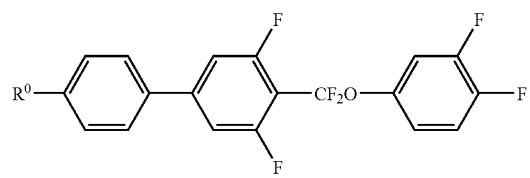

K-6
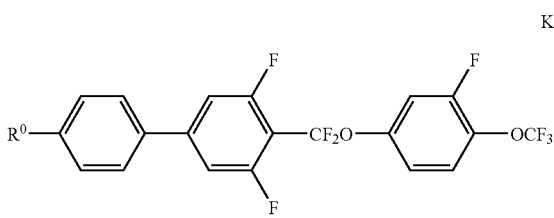

K-7
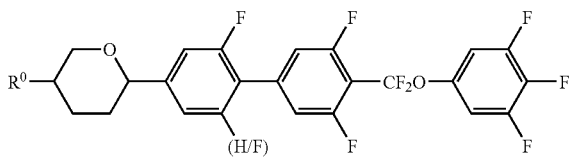

K-8
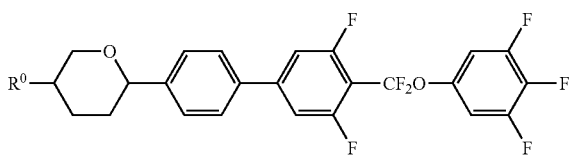

K-9
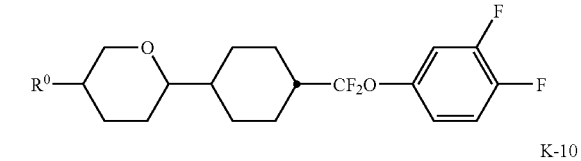

K-10
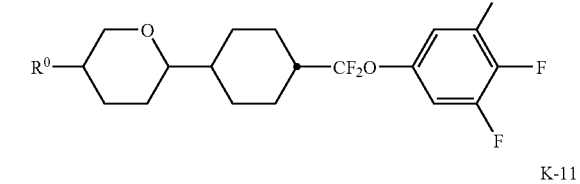

K-11
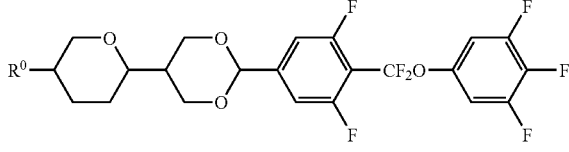

in which

R⁰ is n-alkyl, oxaalkyl, fluoroalkyl or alkenyl, each having up to 9 C atoms.

15. A liquid-crystalline medium according to claim 1, which has a nematic phase down to −20°C., a clearing point above 60°C., and a dielectric anisotropy value Δε of ≧3.

16. A liquid-crystalline medium according to claim 1, which has a nematic phase down to −40°C., a clearing point above 70°C., and a dielectric anisotropy value Δε of ≧7.

17. A liquid-crystalline medium according to claim 15, which has a clearing point above 90°C.

18. A liquid-crystalline medium according to claim 14, comprising one or more compounds of formulae I-1, I-2, I-3, I-4, I-5, I-6, I-7, I-8, I-9, I-10, and/or I-11:

I-1
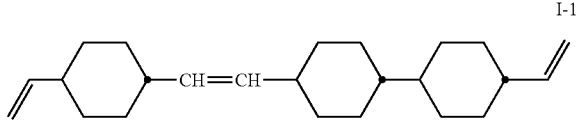

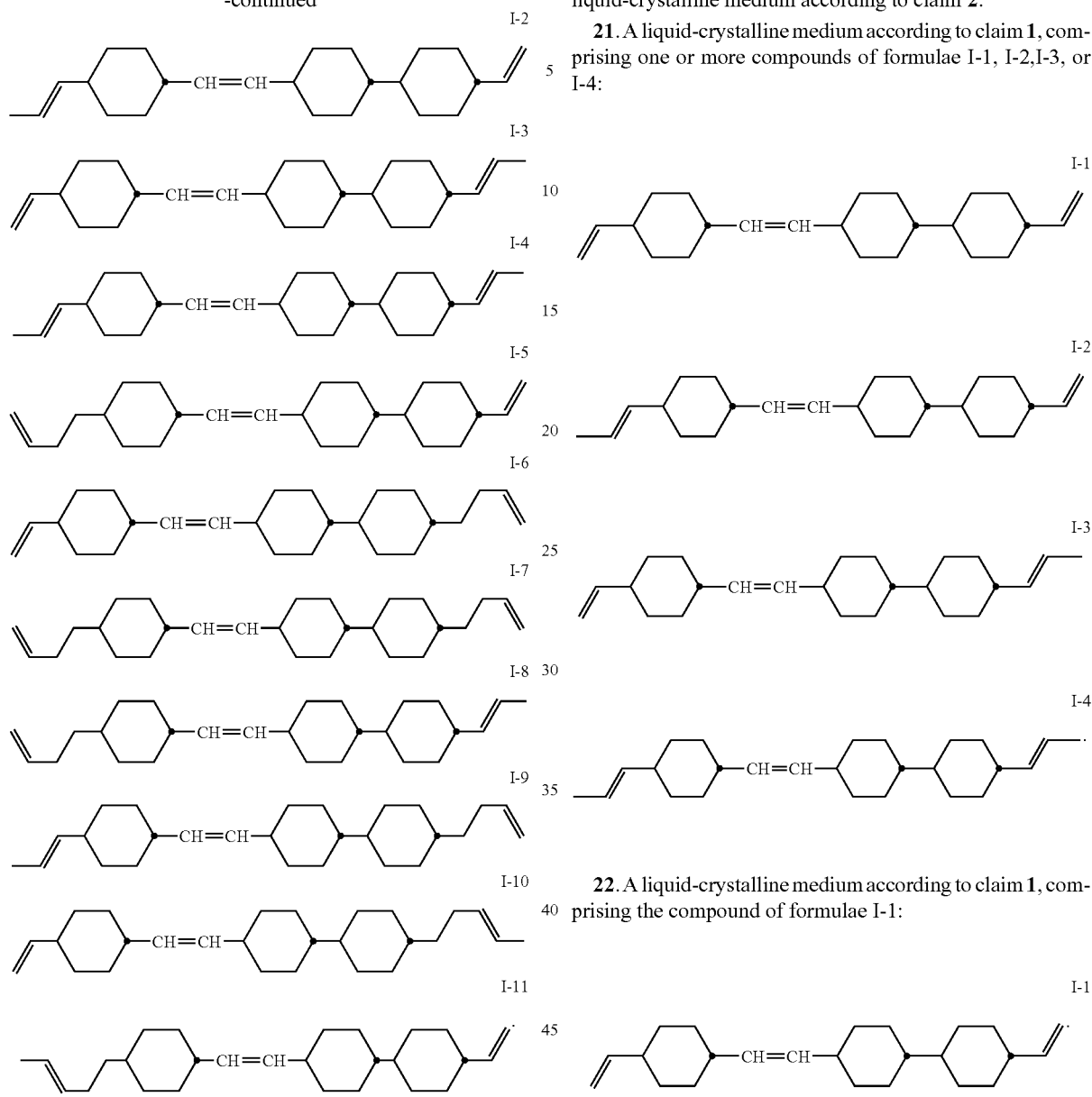

19. An electro-optical liquid-crystal display comprising a liquid-crystalline medium according to claim 14.

20. An electro-optical liquid-crystal display comprising a liquid-crystalline medium according to claim 2.

21. A liquid-crystalline medium according to claim 1, comprising one or more compounds of formulae I-1, I-2, I-3, or I-4:

22. A liquid-crystalline medium according to claim 1, comprising the compound of formulae I-1:

* * * * *

UNITED STATES PATENT AND TRADEMARK OFFICE
CERTIFICATE OF CORRECTION

PATENT NO. : 7,442,419 B2
APPLICATION NO. : 11/684190
DATED : October 28, 2008
INVENTOR(S) : Harald Hirschmann It is certified that error appears in the above-identified patent and that said Letters Patent is hereby corrected as shown below:

Column 54, line 59, reads "—$CH_2$—" should read -- —$CH_2O$— --
Column 56, line 46, reads "comprising puffing said" should read -- comprising putting said --

Signed and Sealed this

Fourteenth Day of July, 2009

JOHN DOLL
*Acting Director of the United States Patent and Trademark Office*